(12) United States Patent
Peake et al.

(10) Patent No.: US 11,521,009 B2
(45) Date of Patent: Dec. 6, 2022

(54) AUTOMATICALLY GENERATING TRAINING DATA FOR A LIDAR USING SIMULATED VEHICLES IN VIRTUAL SPACE

(71) Applicant: Luminar Technologies, Inc., Orlando, FL (US)

(72) Inventors: Miguel Alexander Peake, Daly City, CA (US); Benjamin Englard, Palo Alto, CA (US)

(73) Assignee: Luminar, LLC, Orlando, FL (US)

( * ) Notice: Subject to any disclaimer, the term of this patent is extended or adjusted under 35 U.S.C. 154(b) by 548 days.

(21) Appl. No.: 16/559,945

(22) Filed: Sep. 4, 2019

(65) Prior Publication Data
US 2020/0074266 A1 Mar. 5, 2020

Related U.S. Application Data

(60) Provisional application No. 62/726,841, filed on Sep. 4, 2018.

(51) Int. Cl.
*G06K 9/00* (2022.01)
*G06K 9/62* (2022.01)
(Continued)

(52) U.S. Cl.
CPC .......... *G06K 9/6256* (2013.01); *G01C 21/28* (2013.01); *G01S 7/4808* (2013.01); *G05D 1/0088* (2013.01); *G05D 1/0231* (2013.01); *G05D 1/0257* (2013.01); *G05D 1/0278* (2013.01); *G06F 13/28* (2013.01); *G06K 9/6257* (2013.01); *G06K 9/6269* (2013.01); *G06N 3/006* (2013.01);
(Continued)

(58) Field of Classification Search
None
See application file for complete search history.

(56) References Cited

U.S. PATENT DOCUMENTS

2017/0369073 A1* 12/2017 Huber .................. B60W 50/00
2018/0074493 A1 3/2018 Prokhorov et al.
(Continued)

OTHER PUBLICATIONS

Non-Final Office Action dated Feb. 9, 2021 for U.S. Appl. No. 16/560,018.

*Primary Examiner* — Wei Wen Yang

(57) ABSTRACT

Automated training dataset generators that generate feature training datasets for use in real-world autonomous driving applications based on virtual environments are disclosed herein. The feature training datasets may be associated with training a machine learning model to control real-world autonomous vehicles. In some embodiments, an occupancy grid generator is used to generate an occupancy grid indicative of an environment of an autonomous vehicle from an imaging scene that depicts the environment. The occupancy grid is used to control the vehicle as the vehicle moves through the environment. In further embodiments, a sensor parameter optimizer may determine parameter settings for use by real-world sensors in autonomous driving applications. The sensor parameter optimizer may determine, based on operation of the autonomous vehicle, an optimal parameter setting of the parameter setting where the optimal parameter setting may be applied to a real-world sensor associated with real-world autonomous driving applications.

75 Claims, 15 Drawing Sheets

(51) Int. Cl.
- *G06N 3/00* (2006.01)
- *G08G 1/0962* (2006.01)
- *G06N 5/04* (2006.01)
- *G06F 13/28* (2006.01)
- *G06T 7/246* (2017.01)
- *G06T 7/50* (2017.01)
- *G05D 1/00* (2006.01)
- *G05D 1/02* (2020.01)
- *G01S 7/48* (2006.01)
- *G01C 21/28* (2006.01)
- *G06V 20/56* (2022.01)
- *G06N 20/00* (2019.01)
- *G06F 9/451* (2018.01)
- *G06T 11/60* (2006.01)

(52) U.S. Cl.
CPC .............. *G06N 5/04* (2013.01); *G06T 7/246* (2017.01); *G06T 7/50* (2017.01); *G06V 20/588* (2022.01); *G08G 1/0962* (2013.01); *G05D 2201/0213* (2013.01); *G06F 9/451* (2018.02); *G06F 2213/28* (2013.01); *G06N 20/00* (2019.01); *G06T 11/60* (2013.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/30241* (2013.01); *G06T 2207/30256* (2013.01)

(56) References Cited

U.S. PATENT DOCUMENTS

| | | | |
|---|---|---|---|
| 2018/0275658 A1* | 9/2018 | Landola | G06V 10/82 |
| 2019/0034794 A1* | 1/2019 | Ogale | G06N 3/08 |
| 2019/0147250 A1 | 5/2019 | Zhang et al. | |
| 2019/0243371 A1 | 8/2019 | Nister et al. | |
| 2019/0303759 A1* | 10/2019 | Farabet | G06F 9/455 |
| 2019/0325241 A1 | 10/2019 | Nunn et al. | |
| 2020/0089506 A1 | 3/2020 | Power et al. | |

\* cited by examiner

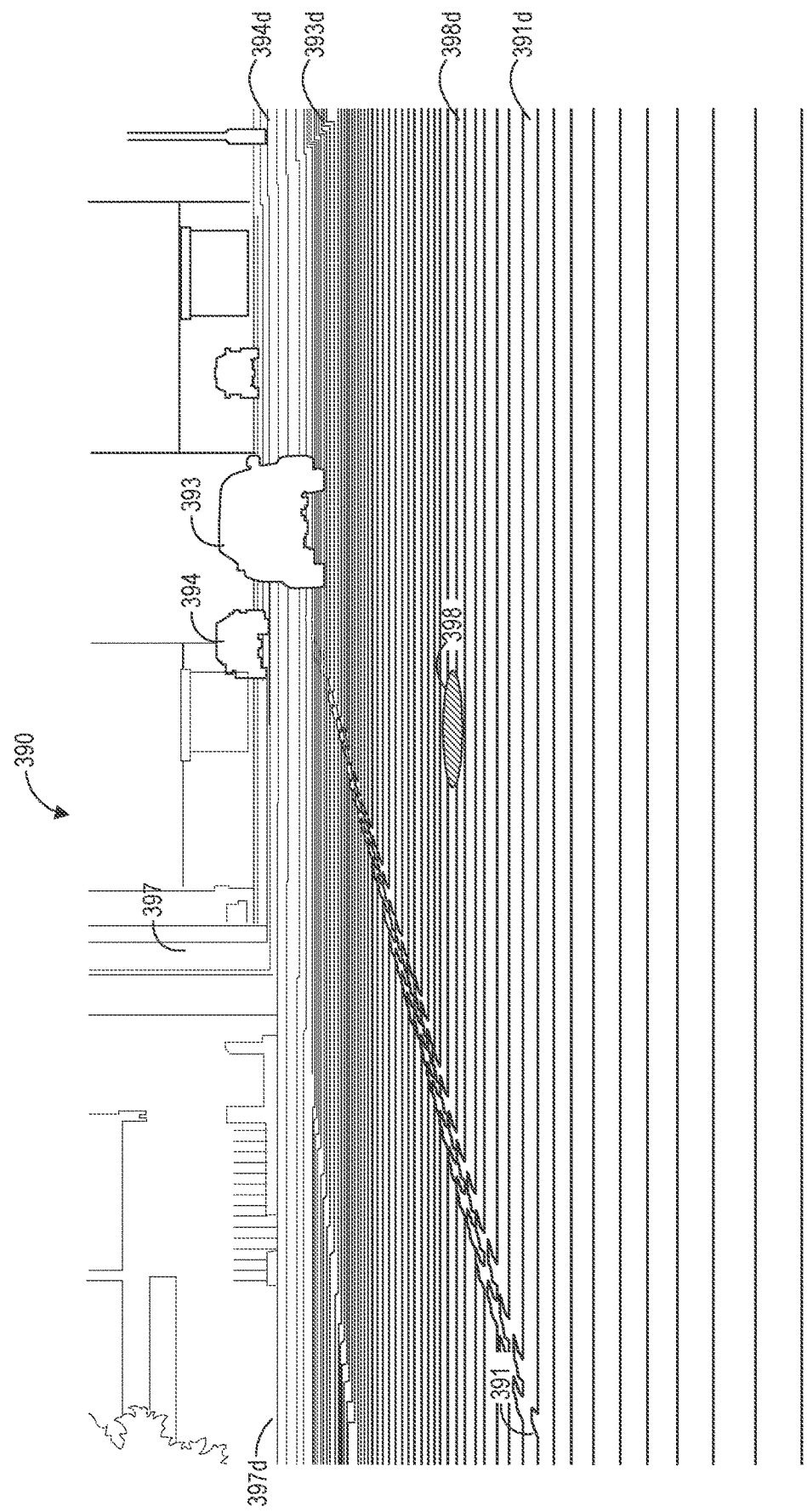

AUTOMATICALLY GENERATING TRAINING DATA FOR A LIDAR USING SIMULATED VEHICLES IN VIRTUAL SPACE

PRIORITY

This application claims the benefit, under 35 U.S.C. § 119(e), of U.S. Provisional Patent Application No. 62/726,841, filed Sep. 4, 2018, which is incorporated herein by reference.

FIELD OF TECHNOLOGY

The present disclosure generally relates to autonomous vehicles, and, more particularly, to generating feature training datasets, and/or other data, for use in real-world autonomous driving applications based on virtual environments.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Machine learning techniques allow correlations, or other associations, to be defined between training datasets and labels. Typical machine learning models require only a trivial amount of data tuples in order to generate sufficiently accurate models. However, sufficiently training a machine-learning based model to control a real-world autonomous vehicle generally requires numerous (e.g., tens of millions of) feature-rich training datasets that correspond to real-world driving concerns and experiences. While collecting real-world observations for trivial datasets to build datasets for traditional machine learning models may be feasible, in contrast, it is generally extremely costly, burdensome, dangerous, and/or impracticable to collect sufficient amounts of training datasets for real-world driving and/or autonomous vehicle activities or purposes. For example, collecting such large amounts of real-world driving datasets may not only be time intensive, but also dangerous because it would necessarily include collecting data related to dangerous real-world vehicular events such as crashes, risky driving, vehicle-and-pedestrian interaction (e.g., including serious injury), etc.

For the foregoing reasons, there is a need for alternative systems and methods to generate feature training datasets for use in real-world autonomous driving applications.

SUMMARY

As described in various embodiments herein, simulated or virtual data may be used to generate and/or obtain feature-rich and plentiful training datasets. In addition, the techniques and embodiments disclosed in the various embodiments herein improve the efficiency and effectiveness of generating and/or collecting numerous autonomous driving datasets, and also address safety concerns with respect to generating sufficient datasets in a non-dangerous and controlled manner when training autonomous vehicles in real-world driving applications.

For example, in various embodiments a non-transitory computer-readable medium, storing thereon instructions executable by one or more processors, may implement an automated training dataset generator that generates feature training datasets for use in real-world autonomous driving applications based on virtual environments. In various aspects, the automated training dataset generator may include an imaging engine configured to generate a plurality of imaging scenes defining a virtual environment. The plurality of imaging scenes may include a plurality of photo-realistic scenes and a plurality of corresponding depth-map-realistic scenes. The automated training dataset generator may include a physics component may configured to generate environment-object data defining how objects or surfaces interact with each other in the virtual environment. The automated training dataset generator may further include an autonomous vehicle simulator configured to control an autonomous vehicle within the virtual environment based on one or both of (i) the plurality of photo-realistic scenes and (ii) the plurality of depth-map-realistic scenes. The automated training dataset generator may further include a dataset component configured to generate one or more feature training datasets based on at least one of (i) the plurality of photo-realistic scenes, (ii) the plurality of depth-map-realistic scenes, or (iii) the environment-object data. The feature training dataset may be associated with training a machine learning model to control an autonomous vehicle in a real-world autonomous driving application.

In additional embodiments, an automated training dataset generation method is disclosed for generating feature training datasets for use in real-world autonomous driving applications based on virtual environments. The automated training dataset generation method may include generating a plurality of imaging scenes defining a virtual environment. The plurality of imaging scenes may include a plurality of photo-realistic scenes and a plurality of corresponding depth-map-realistic scenes. The automated training dataset generation method may further include generating environment-object data defining how objects or surfaces interact with each other in the virtual environment. The automated training dataset generation method may further include controlling an autonomous vehicle within the virtual environment based on one or both of (i) the plurality of photo-realistic scenes and (ii) the plurality of depth-map-realistic scenes. The automated training dataset generation method may further include generating one or more feature training datasets based on at least one of (i) the plurality of photo-realistic scenes, (ii) the plurality of depth-map-realistic scenes, or (iii) the environment-object data. The feature training dataset may be associated with training a machine learning model to control an autonomous vehicle in a real-world autonomous driving application.

In further embodiments, a non-transitory computer-readable medium, storing thereon instructions executable by one or more processors, may implement an occupancy grid generator for generating an occupancy grid indicative of an environment of a vehicle from an imaging scene that depicts the environment. The occupancy grid generator may include a normal layer component configured to generate a normal layer based on the imaging scene. The normal layer may define a two-dimensional (2D) view of the imaging scene. The occupancy grid generator may further include a label layer component configured to generate a label layer. In various aspects, the label layer may be mapped to the normal layer and encoded with a first channel set. The first channel set may be associated with one or more text-based or state-based values of one or more objects of the environment. The occupancy grid generator may further include a velocity layer component configured to generate a velocity layer. In various aspects, the velocity layer may be mapped to the normal layer and encoded with a second channel set.

In various aspects the second channel set may be associated with one or more velocity values of one or more objects of the environment. In some embodiments, the occupancy grid generator may generate an occupancy grid based on the normal layer, the label layer, and the velocity layer. The occupancy grid may be used to control the vehicle as the vehicle moves through the environment.

In additional embodiments, an occupancy grid generation method is disclosed for generating an occupancy grid indicative of an environment of a vehicle from an imaging scene that depicts the environment. The occupancy grid generation method may include generating a normal layer based on the imaging scene, the normal layer defining a two-dimensional (2D) view of the imaging scene. The occupancy grid generation method may further include generating a label layer. The label layer may be mapped to the normal layer and encoded with a first channel set. The first channel set may be associated with one or more text-based or state-based values of one or more objects of the environment. The occupancy grid generation method may further include generating a velocity layer. The velocity layer may be mapped to the normal layer and encoded with a second channel set. The second channel set may be associated with one or more velocity values of one or more objects of the environment. The occupancy grid generation method may further include generating an occupancy grid based on the normal layer, the label layer, and the velocity layer. The occupancy grid may be used to control the vehicle as the vehicle moves through the environment.

In further embodiments, a non-transitory computer-readable medium, storing thereon instructions executable by one or more processors, may be configured to implement a sensor parameter optimizer that determines parameter settings for use by real-world sensors in autonomous driving applications. In various aspects, the sensor parameter optimizer may include an imaging engine configured to generate a plurality of imaging scenes defining a virtual environment. The sensor parameter optimizer may further include a sensor simulator configured to receive a parameter setting for each of one or more virtual sensors. The sensor simulator may be to generate, based on the parameter settings and the plurality of imaging scenes, sensor data indicative of current states of the virtual environment. The sensor parameter optimizer may also include an autonomous vehicle simulator configured to control an autonomous vehicle within the virtual environment based on the sensor data. In various aspects, the sensor parameter optimizer may determine, based on operation of the autonomous vehicle, an optimal parameter setting of the parameter setting where the optimal parameter setting may be applied to a real-world sensor associated with real-world autonomous driving applications.

In additional embodiments, a sensor parameter optimizer method for determining parameter settings for use by real-world sensors in autonomous driving applications is disclosed. The sensor parameter optimizer method may include generating a plurality of imaging scenes defining a virtual environment. The sensor parameter optimizer method may further include receiving a parameter setting for each of one or more virtual sensors, and generating, based on the parameter settings and the plurality of imaging scenes, sensor data indicative of current states of the virtual environment. The sensor parameter optimizer method may further include controlling an autonomous vehicle within the virtual environment based on the sensor data, and determining, based on operation of the autonomous vehicle, an optimal parameter setting of the parameter setting. The optimal parameter setting may be applied to a real-world sensor associated with real-world autonomous driving applications.

In accordance with the above, and with the disclosure herein, the present disclosure includes improvements in computer functionality or in improvements to other technologies at least because the claims recite, e.g., generating feature training datasets, or other data, for use in real-world autonomous driving applications based on virtual environments. That is, the present disclosure describes improvements in the functioning of the computer itself or "any other technology or technical field" because feature training datasets, or other data, may be generated for use in real-world autonomous driving applications based on virtual environments. This improves over the prior art at least because collecting large amounts of training data in a real-world environment is both time extensive, dangerous, and generally infeasible.

The present disclosure includes specific features other than what is well-understood, routine, conventional activity in the field, or add unconventional steps that confine the claim to a particular useful application, e.g., because use of the techniques disclosed allow machine learning models and self-driving control architectures for controlling virtual or autonomous vehicles to be generated or developed in a safe, efficient, and effective manner compared with collection of such data to train such models or develop such self-control architectures in the real-world.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figure is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 3 illustrates an example depth-map-realistic scene of a virtual environment in accordance with various embodiments disclosed herein;

Figure 1:
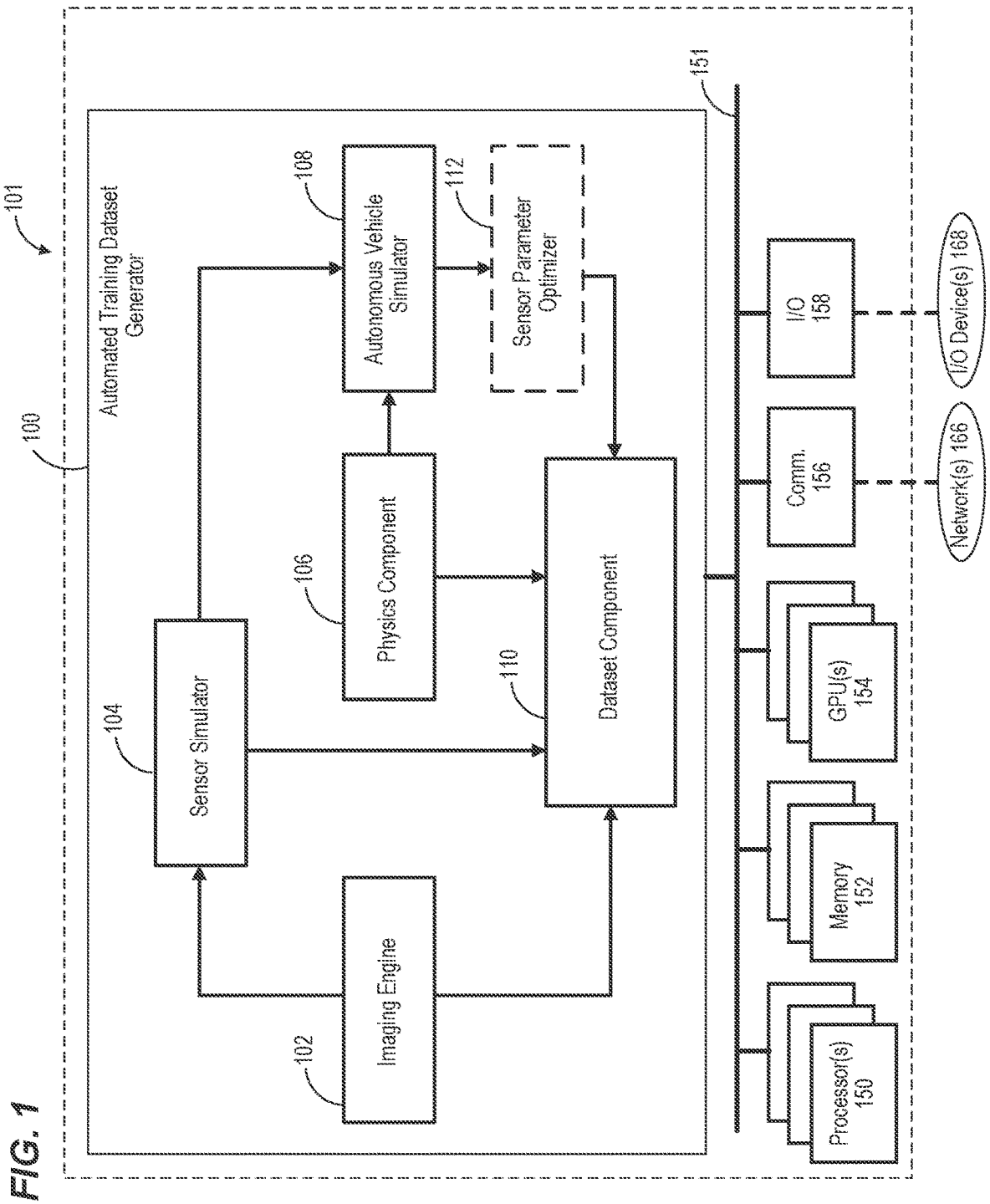
FIG. 1 is a block diagram of an example automated training dataset generator in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION

Overview

Accordingly, a software architecture includes an automated training dataset generator that generates feature training datasets based on simulated or virtual environments. The feature training datasets may be used to train various machine learning models for use in real-world autonomous driving applications, e.g., to control the maneuvering of autonomous vehicles. The feature training datasets may include virtual data based on photo-realistic scenes (e.g., simulated 2D image data), depth-map realistic scenes (e.g., simulated 3D image data), and/or environment-object data (e.g., simulated data defining how objects or surfaces interact), each corresponding to the same virtual environment. For example, the environment-object data for a particular vehicle in the virtual environment may relate to the vehicle's motion (e.g., position, velocity, acceleration, trajectory, etc.). In some embodiments, interactions between objects or surfaces within the virtual environment can affect the data outputted for the simulated environment, e.g., rough roads or potholes may affect measurements of a virtual inertial measurement unit (IMU) of a vehicle. As one embodiment, for example, environment-object data could include data regarding geometry or physics related to a vehicle striking a pothole in a virtual environment. More generally, environment-object data may broadly to refer to information about objects/surfaces within a virtual environment, e.g., interactions between objects or surfaces in the virtual environment and how those interactions effect the objects or surfaces in the virtual environment, e.g., a vehicle hitting a pothole. In addition, or alternatively, environment-object data may define how objects or surfaces will interact if they come into contact with other objects or surfaces in a virtual environment (e.g., indicating hardness, shape/profile, roughness, etc. of objects or surfaces in a virtual environment). Still further, in addition, or alternatively, environment-object data may define how objects or surfaces interact when such objects or surfaces do, in fact, interact with each other within a virtual environment (e.g., data indicating shock to a virtual vehicle when it strikes a virtual pothole, etc.).

The virtual environment may be generated and/or rendered from the viewpoint of one or more autonomous vehicle(s) operating within the virtual environment. In some implementations, the feature training datasets may be updated with real-world data such that the feature training datasets include both simulated data and real-world data.

In some implementations, the autonomous vehicle may follow either a standard or a randomized route within the virtual environment. The standard route may cause the training dataset generator to produce virtual data that tests autonomous vehicle behavior via a predefined route (e.g., to provide a better comparative assessment of the performance of the autonomous vehicle as design changes are made over time). The randomized route may cause the training dataset generator to produce virtual data that tests autonomous vehicle behavior via a route with a number of randomly-generated aspects (e.g., random street layouts, random driving behaviors of other vehicles, etc.). In this way, the randomized route may cause the generation of robust training data by ensuring that a broad array of environments and scenarios are encountered.

Each object or surface within the virtual environment may be associated with one or more descriptors or labels. Such descriptors or labels can include a unique identifier (ID) identifying the surface or object within the virtual environment. The descriptors or labels can also be used to define starting points, starting orientations, and/or other states or statuses of objects or surfaces within the virtual environment. The descriptors or labels can also be used to define object class(es) and/or future trajectory of an object or surface within the virtual environment.

In some implementations, a fully autonomous vehicle may interact with simple waypoint vehicles that follow predetermined routes within the virtual environment. The training dataset generator may generate feature training datasets for the fully autonomous vehicle based in part on interactions between the fully autonomous vehicle and the waypoint vehicles. Despite their relatively simple control algorithms or architectures, the waypoint vehicles may simulate different driving strategies so as to vary the interactions between the waypoint vehicles and the fully autonomous vehicle, and thereby vary the feature training datasets generated from such interactions. For example, one or more virtual waypoint vehicles may be configured to navigate respective predetermined route(s) including a number of roads or intersections. The one or more virtual waypoint vehicles may also be configured to perform certain activities within the virtual environment or have certain behaviors. For example, in one embodiment, a waypoint vehicle may be configured to exceed a speed limit or to run a red light. Such activity or behavior may cause the fully autonomous vehicle to react in a particular manner within the virtual environment, which, in turn, would cause the training dataset generator to generate feature training datasets for the fully autonomous vehicle based on the reaction.

In some implementations, a sensor simulator may generate simulated sensor data within the virtual environment. For example, one or more virtual sensors may be placed in various positions around one or more vehicles in the virtual environment for the purpose of generating the simulated sensor data. The sensor simulator may simulate lidar (e.g., light detection and ranging) readings using ray casting or depth maps, for example, and/or images captured by a camera, etc. In addition, particular objects or surfaces in the virtual environment may be associated with reflectivity values for the purpose of simulating lidar and/or thermal camera readings. Lidar parameters such as scan patterns, etc., can be optimized, and/or models that control lidar parameters may be trained, using the data collected by simulating lidar readings in the virtual environment. The reflectively data or other simulated data may be accessed efficiently and quickly using direct memory access (DMA) techniques.

In still further implementations, the virtual environment may be at least partially generated based on geo-spatial data. Such geo-spatial data may be sourced from predefined or existing images or other geo-spatial data (e.g., height maps or geo-spatial semantic data such as road versus terrain versus building data) as retrieved from remote sources (e.g., Mapbox images, Google Maps images, etc.). For example, the geo-spatial data may be used as a starting point to construct detailed representations of roads, lanes for the roads, and/or other objects or surfaces within the virtual environment. If previously collected image or depth data is available for a particular region of the virtual environment, then the system also can use real-world lidar data, and/or use techniques such as SLAM or photogrammetry to construct the virtual environment to provide additional real-world detail not specified by the map-based geo-spatial data.

The autonomous vehicle may implement configurable driving strategies for more diversified generation of feature training datasets. In some implementations, generative machine learning models, such as generative adversarial networks (GANs), may be used to dynamically generate objects, surfaces, or scenarios within the virtual environment, including, for example, dynamically generated signs, obstacles, intersections, etc. In other embodiments, standard procedural generation ("proc gen") may also be used.

More generally, generative machine learning models may be used to generate at least a portion of the virtual environment. In addition, user-built (by users) and procedurally generated parts of the virtual world can be combined. Configurable parameters may allow a user to set the status or state of objects, surfaces, or other attributes of the virtual environment. For example, the configurable parameters may include the starting position of a vehicle within the virtual environment, or time of day, weather conditions, etc., or ranges thereof. A configuration file manager may be used to accept a predefined configuration that defines the configurable parameters.

In some implementations, correspondences between actions (e.g., driving forward in a certain setting) and safety-related outcomes (e.g., avoiding collision) can be expressed as a ground truth and used in generating training dataset(s) or other data as described herein. For example, the ground truth may be expressed as a series of ground truth values that each include an action parameter and a corresponding safety parameter. The safety parameter may define a safety-related outcome (e.g., crash, no crash, etc.), or a degree of safety (e.g., 1% collision risk, etc.). Unlike in the real-world, ground truth correspondences may be learned by simulating alternative virtual realities relative to any given starting point/scenario. For example, the simulator may show that maintaining a lane in a certain scenario results in no crash (or results in a situation with a 0.002% crash risk, etc.), while moving to the right lane in the exact same scenario results in a crash (or results in a situation with a 1.5% crash risk, etc.). The ground truth data may be used for various types of training. For example, in an embodiment where an autonomous vehicle implements a number of independent, self-driving control architectures (SDCAs) in parallel, and makes driving decisions by selecting the driving maneuvers that are indicated by the most SDCAs (i.e., a "vote counting" process), the ground truth data may be useful to learn which SDCAs are more trustworthy in various scenarios. As another example, because the simulator can be forward-run many times from any starting point/scenario, the likelihood that a given prediction (e.g., of the state of the vehicle environment) will come to pass can be determined with a fairly high level of confidence. Thus, the ground truth data may be used to train a neural network that predicts future states of the vehicle environment (e.g., for purposes of making driving decisions).

In some implementations, an occupancy grid indicative of an environment of a vehicle is generated from an imaging scene that depicts the environment. The occupancy grid includes, or is generated from several layers (e.g., rendering layers), including a normal layer (e.g., a game engine or camera layer representing a virtual camera view, e.g., of a road/building picture scene), a label layer (e.g., text-based or state-based values describing objects in the virtual environment), and a velocity layer (e.g., velocity values defining direction/speed of moving objects). The label layer and velocity layers have channel sets (e.g., RGB based channel) for encoding their respective values within the layers. For example, class labels and velocity vectors can be transformed into an RGB encoding at different rendering layers, including, for example, the label layer and velocity layer, each of which a virtual camera of the virtual environment would recognize. The RGB encoding may then be decoded to generate information related to, for example, the locations of objects of different classes and their velocities. The occupancy grid may be used to control an autonomous vehicle as the autonomous vehicle moves through the environment, in either a virtual or a real-world environment. The multi-layer encoding of the occupancy grid, including normal, label, and velocity layers, provides a highly efficient representation of the environment.

In still further implementations, a sensor parameter optimizer may determine parameter settings for use by real-world sensors in autonomous driving applications. For example, the sensor parameter optimizer may include the sensor simulator discussed above, and may determine, based on the operation of an autonomous vehicle reacting to the simulated sensor data within the virtual environment, an optimal parameter setting, and/or a range or an approximation of such settings, for use with a real-world sensor associated with real-world autonomous driving applications.

Example Automated Training Dataset Generator

FIG. 1 is a block diagram of an example automated training dataset generator 100 in accordance with various embodiments disclosed herein. As depicted in FIG. 1, automated training dataset generator 100 may be implemented via graphics platform 101. Graphics platform 101 may be a computing device, such as a server, graphics rendering computer (e.g., including various graphic processing units), or other such computer capable of rendering, generating, visualizing, or otherwise determining virtual or simulated information, such as photo-realistic scenes, depth-map-realistic scenes, point cloud information, the feature training dataset(s), views, visualizations, 2D or 3D scenes, or other information as described herein. It is to be understood that such feature training dataset(s), views, visualizations, 2D or 3D scenes, or other information may include various forms and/or types of information for purposes of training machine learning models and/or self-driving control architectures as described herein. Such virtual or simulated information may include, but is not limited to graphic-based information, e.g., pixel information, RGB information, visualizations, and the like generated within, or as part of, various virtual environments or scenes as described herein. Such virtual or simulated information may further include text or parameter based information, such as, e.g., labels, descriptors, settings (e.g., sensor or environment settings) information as described herein. Such virtual or simulated information may be used to train machine learning models and/or self-driving control architectures used in the operation of real-world autonomous vehicles. In addition, such virtual or simulated information may be generated in automatic fashion to efficiently generate millions of feature training datasets to provide robust and accurate machine learning models.

Graphics platform 101 may include one or more processor(s) 150 as well computer memory 152, which could comprise one or more computer memories, memory chips, etc. as illustrated in FIG. 1. For example, memory 152 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory 152 may store an operating system (OS) (e.g., Microsoft Windows, Linux, Unix, etc.) capable of facilitating the functionalities as discussed herein. Memory 152 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, the machine learning component and/or the search engine optimization component, where each are configured to facilitate their various functionalities discussed herein. It should be appreciated that one or more other applications executed by the processor(s) 150 may be envisioned.

Processor(s) 150 may be connected to memory 152 via a computer bus 151 responsible for transmitting electronic data, data packets, or otherwise electronic signals to and from the processor(s) 150 and memory 152 in order to implement or perform the machine readable instructions, methods, processes, elements or limitations, as illustrated, depicted, or described for the various flowcharts, illustrations, diagrams, figures, and/or other disclosure herein.

Processor(s) 150 may interface with memory 152 via computer bus 151 to execute the operating system (OS). The processor(s) 150 may also interface with memory 152 via computer bus 151 to create, read, update, delete, or otherwise access or interact with the data stored in memory 152. In some embodiments, the memory(s) may store information or other data as described herein in a database (e.g., a relational database, such as Orcale, DB2, MySQL, or a NoSQL based database, such as MongoDB). The data stored in memory 152 may include all or part of any of the data or information described herein, including, for example, the photo-realistic scenes, the depth-map-realistic scenes, the environment-object data, feature training dataset(s), or other information or scenes as described herein.

Graphics platform 101 may include one or more graphical processing unit(s) (GPU) 154 for rendering, generating, visualizing, or otherwise determining the photo-realistic scenes, depth-map-realistic scenes, point cloud information, the feature training dataset(s), views, visualizations, 2D or 3D scenes, or other information as described herein.

Graphics platform 101 may further include a communication component 156 configured to communicate (e.g., send and receive) data via one or more external/network port(s) to one or more network(s) 166. According to some embodiments, communication component 156 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports.

In some embodiments, graphics platform 101 may include a client-server platform technology such as ASP.NET, Java J2EE, Ruby on Rails, Node.js, a web service or online API, responsive for receiving and responding to electronic requests via communication component 156.

Processor(s) 150 may interact, via the computer bus 151, with memor(ies) 152 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

Graphics platform 101 may further include or implement I/O connections 158 that interface with I/O device(s) 168 configured to present information to an administrator or operator and/or receive inputs from the administrator or operator. For example, an operator interface may include a display screen. I/O device(s) 168 may include touch sensitive input panels, keys, keyboards, buttons, lights, LEDs, which may be accessible via graphics platform 101. According to some embodiments, an administrator or operator may access the graphics platform 101 via I/O connections 158 and I/O device(s) 168 to review information, make changes, input training data, and/or perform other functions.

In some embodiments, graphics platform 101 may perform the functionalities as discussed herein as part of a "cloud" network or may otherwise communicate with other hardware or software components within the cloud to send, retrieve, or otherwise analyze data, dataset(s), or information described herein.

In general, a computer program or computer based product in accordance with some embodiments may include a computer usable storage medium, or tangible, non-transitory computer-readable medium (e.g., standard random access memory (RAM), an optical disc, a universal serial bus (USB) drive, or the like) having computer-readable program code or computer instructions embodied therein, wherein the computer-readable program code or computer instructions may be installed on or otherwise adapted to be executed by the processor(s) 150 (e.g., working in connection with the respective operating system in memory 152) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, Actionscript, JavaScript, HTML, CSS, XML, etc.).

Automated training dataset generator 100, in some implementations, may include one or more software engines, components, or simulators for rendering, generating, or otherwise determining the feature training dataset(s), scenes, data, or other information as described herein. In some embodiments, imaging engine 102, sensor simulator 104, physics component 106, autonomous vehicle simulator 108, dataset component 110, and/or sensor parameter optimizer 112 may be separate software entities. For example, the imaging engine 102 may be provided by a third-party provider, such as a commercial or open source based gaming engine. For example, the in some embodiments, imaging engine 102 of automated training dataset generator 100 may be a gaming engine implemented via multimedia application programming interface(s) (e.g., DirectX, OpenGL, etc.) that is/are executed by the automated training dataset generator 100. In other embodiments, imaging engine 102, sensor simulator 104, physics component 106, autonomous vehicle simulator 108, dataset component 110, and/or sensor parameter optimizer 112 may be part of the same software library, package, API, or other comprehensive software stack designed to implement the functionality as described herein.

It will be understood that various arrangements and configurations of the components of automated training dataset generator 100 (e.g., imaging engine 102, sensor simulator 104, physics component 106, autonomous vehicle simulator 108, dataset component 110, and/or sensor parameter optimizer 112) such that the disclosure of the components of automated training dataset generator 100 do not limit the disclosure to any one particular embodiment. It is to be further understood that, in some embodiments (not shown), certain components may perform the features of other components. For example, in some embodiments the imaging engine 102 may perform one or more of the features of the sensor simulator 104 and/or physics component 106. Thus, the components of automated training dataset generator 100 (e.g., imaging engine 102, sensor simulator 104, physics component 106, autonomous vehicle simulator 108, dataset component 110, and/or sensor parameter optimizer 112) are not limited and may perform the features of other components of automated training dataset generator 100 as described herein.

Automated training dataset generator 100 of FIG. 1 is configured to generate, e.g., via processor(s) 150 and GPU(s) 154, feature training datasets for use in real-world autonomous driving applications based on virtual environments. In particular, the automated training dataset generator 100, with its various components (e.g., imaging engine 102, sensor simulator 104, physics component 106, autonomous vehicle simulator 108, dataset component 110, and/or sensor parameter optimizer 112), is configured to generate model training datasets of simulated/virtual environments for use in training machine learning models for real-world autonomous driving applications.

Imaging engine 102 may be configured to generate a plurality of imaging scenes defining a virtual environment. The plurality of imaging scenes generated by imaging engine 102 may include a plurality of photo-realistic scenes and a plurality of corresponding depth-map-realistic scenes. The imaging scenes may be generated by processor(s) 150 and/or GPU(s) 154.

In various embodiments, the imaging engine 102 may be a virtual engine or gaming engine (e.g., a DirectX-based, OpenGL-based, or other gaming engine) that can render 2D and/or 3D images of a virtual environment. The virtual environment, as referred to herein, may include a computer rendered environment including streets, roads, intersections, overpasses, vehicles, pedestrians, buildings or other structures, traffic lights or signs, or any other object or surface capable of being rendered in a virtual environment, such as a 2D or 3D environment. In some embodiments, imaging engine 102 may consist of a third-party engine, such as a gaming engine including any of the Unreal gaming engine, the Unity gaming engine, the Godot gaming engine, the Amazon Lumberyard gaming engine, or other such engines. In other embodiments, imaging engine 102 may also be a proprietary engine, or a partial-proprietary engine (e.g., comprising third-party and proprietary source code), developed for the purpose of generating imaging scenes, e.g., photo-realistic scenes, depth-map-realistic scenes, or other such information as described herein. Imaging engine 102 may implement one or many graphic API(s) for rendering or generating imaging scenes, depth-map-realistic scenes, or other such information as described herein. Such APIs may include the OpenGL API, DirectX API, Vulkan API, or other such graphics and rendering APIs. The APIs may interact with GPU(s) 154 to render the imaging scenes, e.g., photo-realistic scenes, depth-map-realistic scenes, or other such information as described herein, and/or to provide hardware-accelerated rendering, which, in some embodiments, could increase the performance, speed, or efficiency in rendering such scenes or information.

Figure 2A:
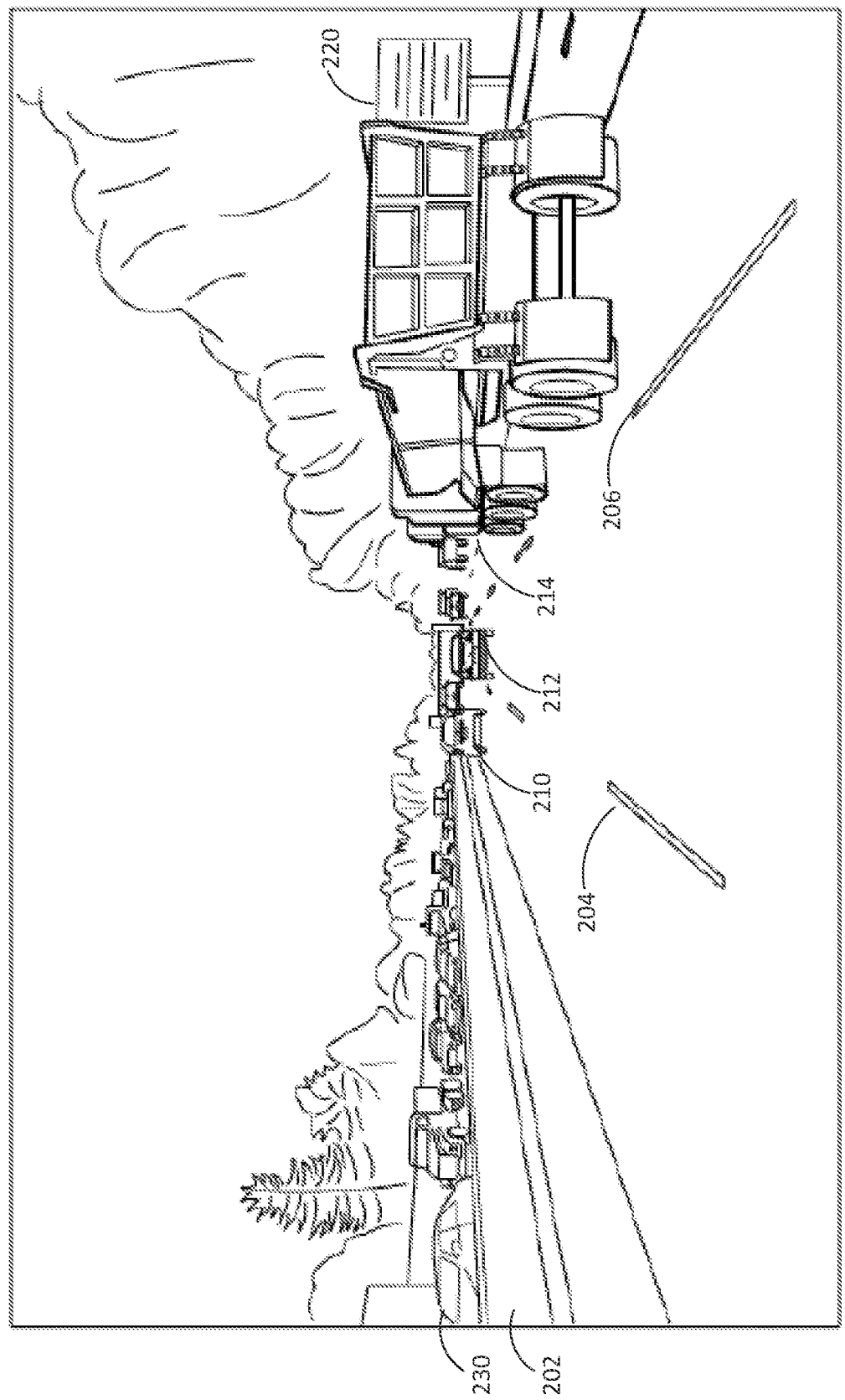
FIG. 2A illustrates an example photo-realistic scene of a virtual environment in the direction of travel of an autonomous vehicle within the virtual environment in accordance with various embodiments disclosed herein.
Figure 4A:
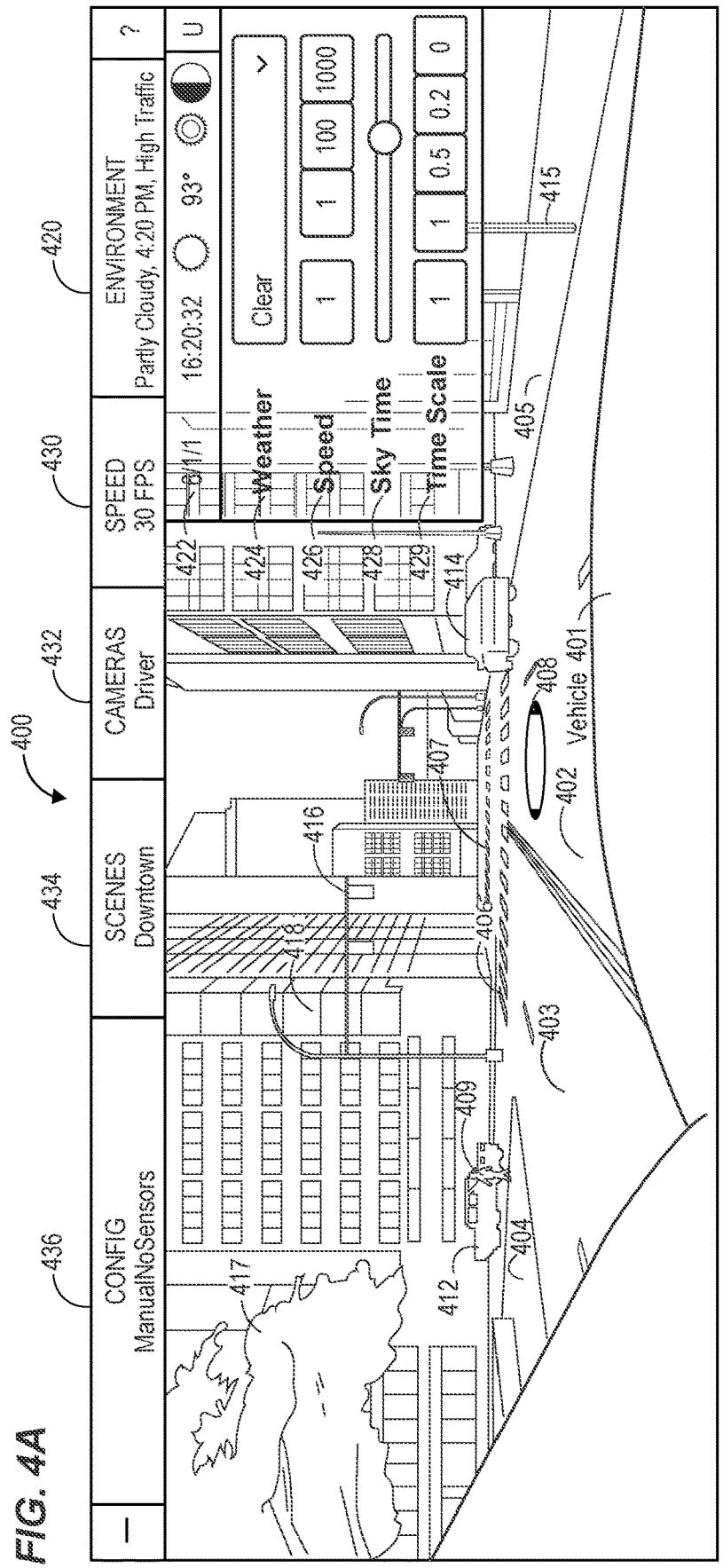
FIG. 4A illustrates another example photo-realistic scene of a virtual environment in the direction of travel of an autonomous vehicle within the virtual environment, and further illustrates examples of various virtual objects associated with environment-object data defining how objects or surfaces interact with each other in the virtual environment in accordance with various embodiments disclosed herein.
Figure 4B:
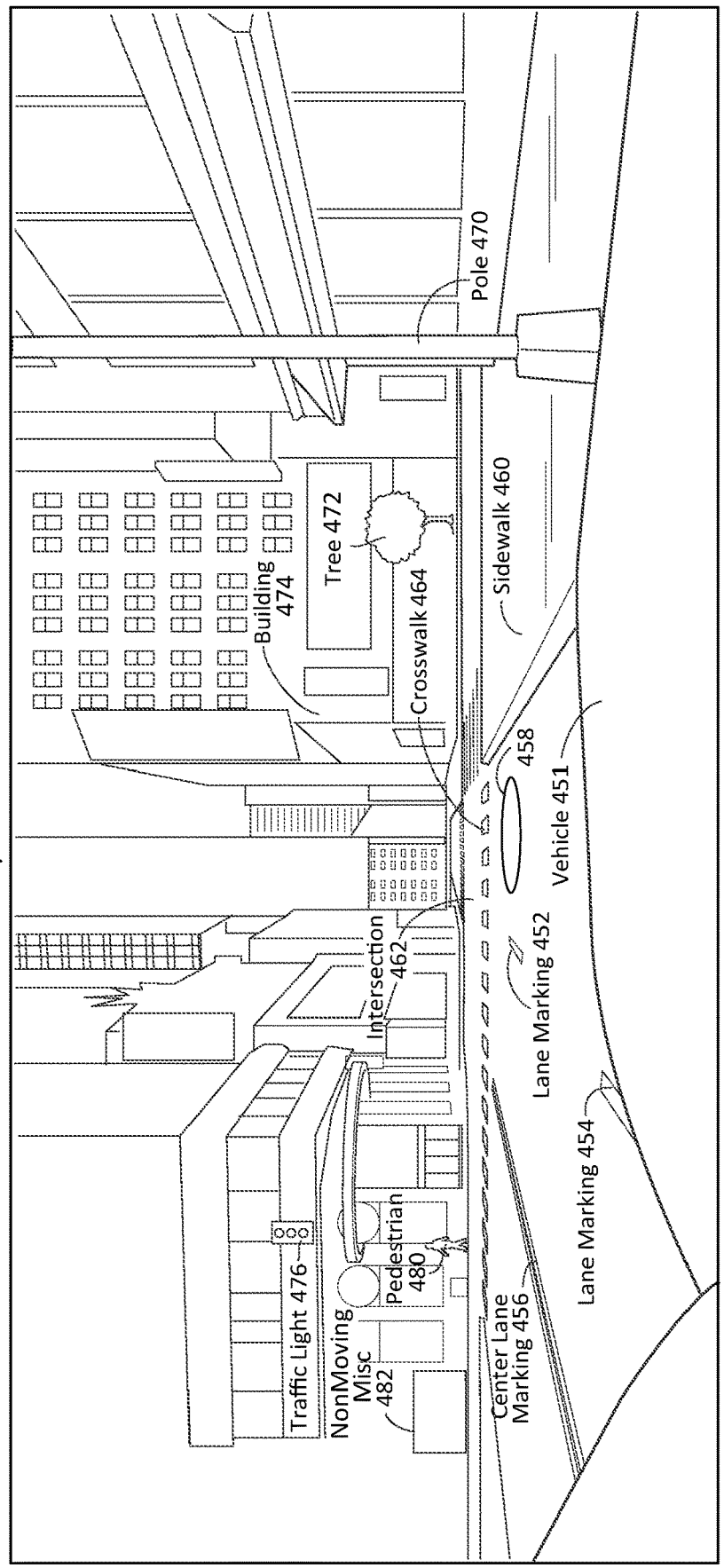
FIG. 4B illustrates a different scene of the virtual environment of FIG. 4A depicting various descriptors associated with objects or surfaces of the virtual environment.

Imaging scenes generated, rendered or otherwise determined via imaging engine 102 of the automated training dataset generator 100 of FIG. 1 may include photo-realistic scenes, such as photo-realistic scenes illustrated by FIGS. 2A, 4A, and 4B as described herein. For example, FIG. 2A illustrates an example photo-realistic scene 200 of a virtual environment in the direction of travel of an autonomous vehicle within the virtual environment of scene 200 in accordance with various embodiments disclosed herein. In the embodiment of FIG. 2A, photo-realistic scene 200 is depicted from the point of view of the autonomous vehicle traveling along a highway. While not shown, the autonomous vehicle of FIG. 2A may be the same as (or similar to) any of the autonomous vehicles described for other scenes and/or virtual environments herein (e.g., such as autonomous vehicles 401, 451, 700, and/or 760 as described herein). As seen in FIG. 2A, the virtual environment of photo-realistic scene 200 includes various rendered objects or surfaces, including a highway with a median wall 202 that divides two directions of traffic, with multiple lanes in each direction. For example, lane markings 204 and 206, as rendered within photo-realistic scene 200, divide three lanes of the highway in the direction of travel of the autonomous vehicle. In addition, photo-realistic scene 200 includes renderings of objects and surfaces, including vehicles 210, 212, 214 moving within each of the lanes divided lane markings 204 and 206, and also renderings of vehicle 230 moving in an opposite direction that the autonomous vehicle within the virtual environment. The photo-realistic scene 200 also includes other object or surface renderings, including highway sign 220. Each of the objects or surfaces of scene 200 may have been rendered by processor(s) 150 and/or GPUs 154 of automated training dataset generator 100, as described herein.

A photo-realistic scene, such as photo-realistic scene 200 of FIG. 2A, may comprise a two-dimensional (2D) image that simulates a real-world scene as captured by a real-world 2D camera or other sensor. Thus, the virtual environment, and its related objects and surfaces, of photo-realistic scene 200 represent a real-world scene for purposes of generating training feature dataset(s) as described herein. Because the photo-realistic scene 200 represents an image captured by a 2D camera, photo-realistic scene 200 may simulate a red-green-blue (RGB) image (e.g., having RGB pixels) as captured by a 2D camera or other sensor. For the same reasons, the photo-realistic scene may simulate an image determined from a visible spectrum of light in a real-world environment (e.g., as represented by the virtual environment of photo-realistic scene 200). Photo-realistic scene 200 of FIG. 2A represents a single frame or image as would be captured by a real-world camera or other sensor. In certain embodiments, multiple images (e.g., frames) may be captured every second, such as at a 30-frames-per-second rate. Imaging engine 102 may be configured to generate images, such as photo-realistic scene 200, in the same or similar capacity (e.g., 30-frames-per-second) in order to simulate the same or similar virtual environment as would be experienced by a real-world autonomous vehicle in a real-world environment. In this way, data or dataset(s) generated by automated training dataset generator 100 simulates real-world environments, and is therefore useful in the training of machine learning models, self-driving architectures, or otherwise, as described herein.

In various embodiments, a 2D image representing a photo-realistic scene (e.g., photo-realistic scene 200) may comprise 2D pixel data (e.g., RGB pixel data) that may be a part of, may include, may be used for, or otherwise may be associated with the feature training dataset(s) described herein. It is to be understood that 2D images, in at least some (but not necessarily all) embodiments, may be initially generated by imaging engine 102 (e.g., a gaming engine) as a 3D image. The 3D image may then be rasterized, converted, or otherwise transformed into a 2D image, e.g., having RGB pixel data. Such RGB pixel data may be used as training data, datasets(s), or as otherwise described herein. In addition, the 3D and/or 2D image may also be converted or otherwise transformed into point cloud data and/or simulated point cloud data, e.g., as described with respect to FIG. 2B, or otherwise herein.

Additionally, or alternatively, imaging scenes generated, rendered or otherwise determined via imaging engine 102 of the automated training dataset generator 100 of FIG. 1 may correspond to a plurality of frames comprising a video. In some embodiments, the video may be rendered at a select number of frames per second (e.g., 30-frames-per-second). In additional embodiments, a video comprised of various frames may define an autonomous vehicle (e.g., any of vehicles 401, 451, 700, and/or 760 as described herein) moving along a standard route within the virtual environment, where the standard route may be a predefined route. In some embodiments, for example, the standard route within a virtual environment may define a ground truth route. For example, the standard route (e.g., ground truth route) may a predetermined route in a virtual environment used to generate baseline training data. In some embodiments, the standard route (e.g., ground truth route) may be the same across multiple virtual vehicle trips within a virtual environment. In such embodiments, an autonomous vehicle may move along the standard route as predetermined. For example, a virtual vehicle (e.g., any of vehicles 401, 451, 700, and/or 760) may be simulated in a virtual environment such that the virtual vehicle travels along a standard route. In such embodiments, data outputs of actions taken by the virtual vehicle may be observed and/or recorded as feature data for purposes of training machine learning models as described herein.

In some embodiments, a vehicle's action(s), e.g., processor(s) 150 may determine or predict how a vehicle is to move within a virtual environment or otherwise act. For example, processor(s) 150 may be configured to operate an autonomous vehicle in accordance with a predetermined ground truth route. For example, in a reinforcement learning simulation (e.g., a simulation ran against a ground truth route 100 times) a vehicle acting according to, and/or in operation with, a ground truth (e.g., by staying on, or operating in accordance with, a ground truth route) would cause the generation of a digital or electronic reward (e.g., incrementing an overall success rate based on the vehicle's behavior). Based on the reward, the automated training dataset generator 100 may adjust vehicle or driving parameters to maximize reward/increase performance of predictions (e.g., update weights of a machine model to correspond to a higher margin of safety) in order to cause the autonomous vehicle to operate more closely with the predetermined ground truth route. For example, rewards, e.g., positive values generated based on positive actions by the vehicle, may be generated when the vehicle, e.g., avoids safety violations (e.g., crashes, and/or disobeying rules of the road, etc.), executes a particular driving style (e.g., aggressive/fast, or smooth with low G-force levels, etc.), and/or any other similar or suitable action indicating a positive action (e.g., by operating in accordance with, or closer to, the ground truth route). In some aspects, the standard route may be useful for implementing vote counters and the like.

In some embodiments, a standard route (e.g., such as a ground truth route) may be used to collect safety data. In such embodiments, ground truth correspondences (e.g., data) may be determined and generated based on an autonomous vehicle's behavior, and autonomous decisions (e.g., as determined by processor(s) 150, etc.) when choosing between actions taking safety into account (e.g., whether to swerve away from a group of pedestrians at the risk of colliding with a wall). In certain embodiments, one or more outputs of a machine learning model may be compared to ground truth value(s). In such embodiments, the ground truth value(s) may each include representations of vehicle action (e.g., from vehicles including vehicles 401, 451, 700, and/or 756 as described herein) and a corresponding safety parameter defining, e.g., a safety-related outcome, or a degree of safety that is associated with the vehicle action. In some embodiments, a machine learning model may be updated to choose vehicle actions that maximize a degree of safety across a plurality of ground truth values. However, in other embodiments, a machine learning model may be updated to choose vehicle actions that vary the degree of safety (e.g., risking driving to safe driving) across a plurality of ground truth values.

In other embodiments, a video (e.g., multiple frames, images, scenes, etc. as described herein) may define an autonomous vehicle (e.g., vehicle 401, 451, 700, and/or 756 as described herein) moving along an undetermined route within the virtual environment. In such embodiments, the undetermined route may be a randomized route. Such randomized route may have multiple different permutations (e.g., different environment characteristics, streets, or other objects or surfaces) for testing or verifying a virtual autonomous vehicle, and its actions, in its virtual environment.

Figure 2B:
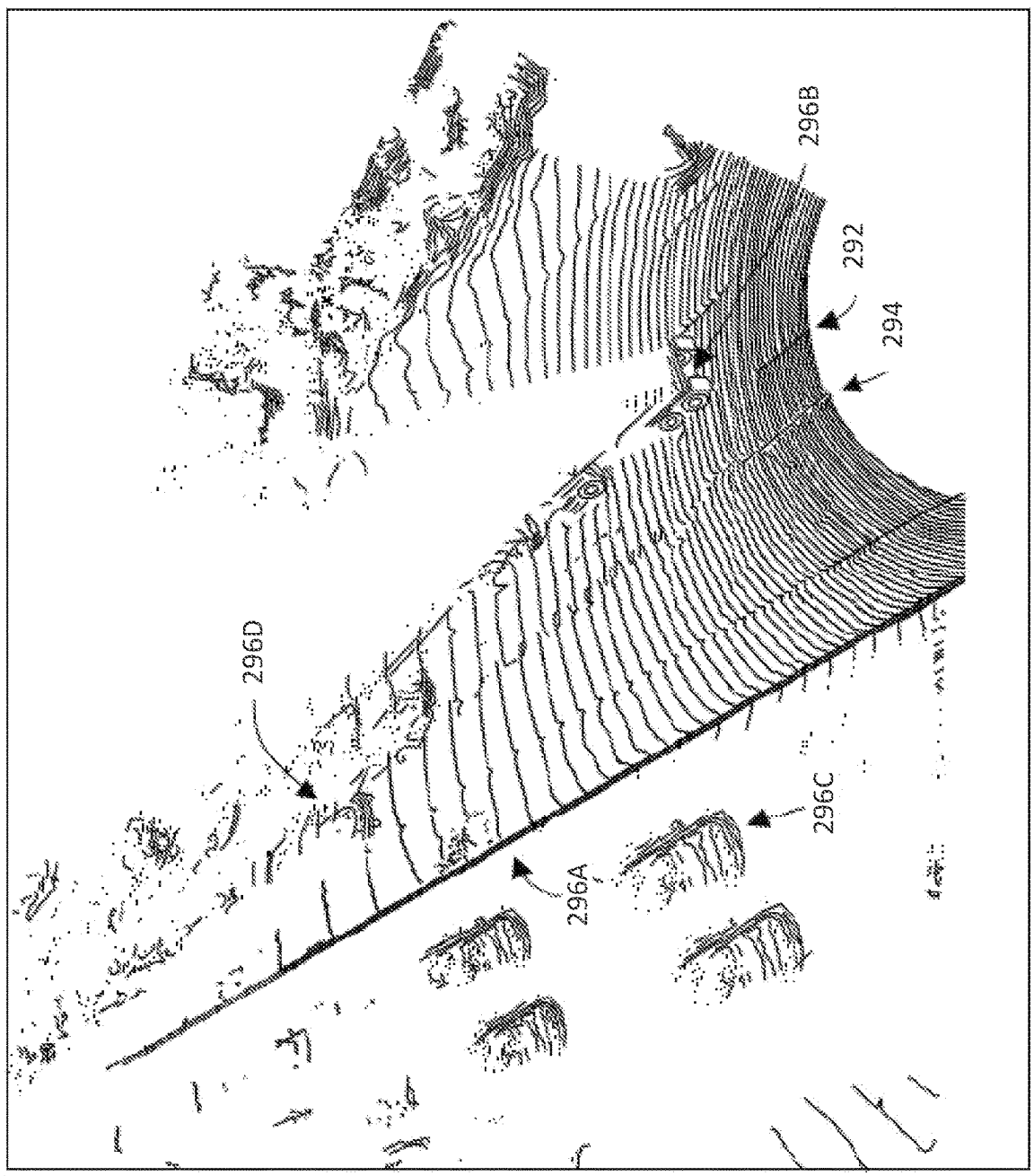
FIG. 2B illustrates an example point cloud that may be generated for the virtual environment of FIG. 2A in accordance with various embodiments disclosed herein.

A point cloud representation of FIG. 2A is described further herein with respect to FIG. 2B. For example, FIG. 2B illustrates an example point cloud that may be generated for the virtual environment of FIG. 2A in accordance with various embodiments disclosed herein. The point cloud 290 of FIG. 2B corresponds to an example embodiment in which two lidar devices (e.g., as described for vehicle 700 or vehicle 760) each capture a roughly 60-degree horizontal field of regard, and in which the two fields of regard have a small overlap 292 (e.g., two or three degrees of overlap). The point cloud 290 may have been generated using the sensor heads 712A and 712D of vehicle 700 of FIG. 7A, or the sensor heads 772A and 772G of vehicle 760 of FIG. 7B, for example. It is to be understood herein that each of vehicle 700 and vehicle 760 may represent either virtual vehicles in a virtual environment or real-world vehicles in a real-world environment. Further, while depicted as a visual image in FIG. 2B, it is understood that, in some embodiments, the point cloud 290 is not actually rendered or displayed at any time. Instead, point cloud 290 may comprise data saved in a database or memory, such as memory 152, or elsewhere as described herein. As seen in FIG. 2B, the point cloud 290 depicts a ground plane 294 (here, the road surface) as a number of substantially continuous scan lines, and also depicts, above the ground plane 294, a number of objects 296 (e.g., vehicles 296A, 296B, 296C, and 296D). For clarity, only a small number of the objects shown in FIG. 2B are labeled with a reference number.

Imaging scenes generated via imaging engine 102 of automated training dataset generator 100 of FIG. 1 may also include depth-map-realistic scenes, such depth-map-realistic scene 390 as illustrated by FIG. 3. FIG. 3 illustrates an example depth-map-realistic scene of a virtual environment in accordance with various embodiments disclosed herein. Depth-map-realistic scene 390 may be rendered by processor(s) 150 and/or GPU(s) 154. In some embodiments, depth-map-realistic scene 390 may be rendered by a shader of a game engine (e.g., such as imaging engine 102). In some embodiments, the shader may be a replacement shader, which may increase the efficiency and/or speed of rendering depth-map-realistic scenes in general (e.g., such as depth-map-realistic scene 390). As illustrated by FIG. 3, depth-map-realistic scenes (e.g., depth-map-realistic scene 390) may be rendered in multiple bit colors (e.g., 16-bit) for a variety of RGB pixel spectrums.

As represented in FIG. 3, one or more pixels (e.g., color/RGB pixels) of depth-map-realistic scene 390 may be associated with one or more corresponding depths (e.g., virtual distances) of objects or surfaces within depth-map-realistic scene 390. Depth-map-realistic scene 390 is depicted from the perspective of a virtual autonomous vehicle (e.g., vehicle 700 or vehicle 760). In such embodiments, color/RGB pixels may indicate how close or far a particular object or surface is from the point of reference (e.g., from the viewpoint of a virtual vehicle, e.g., vehicle 401, 451, 700, and/or 756 as described herein) of the scene as rendered. For example, as shown in depth-map-realistic scene 390, pixels at distance 391*d* may represent a certain distance within depth-map-realistic scene 390. As depicted, pixels at distance 391*d* span across depth-map-realistic scene 390 in a horizontal fashion simulating or mimicking scan lines, readings, or otherwise signals of a lidar-based system. In the embodiment of FIG. 3, pixels at distance 391*d* indicate the distance of a portion of a center lane marking 391 is to the virtual autonomous vehicle of FIG. 3. Similarly, pixels at distance 398*d* indicate the distance of a pothole 398 in the road that the virtual autonomous vehicle of FIG. 3 is traveling along. In still further examples, pixels at distance 393*d* and pixels at distance 394*d* indicate the respective distances of vehicle 393 and vehicle 394 as each detected by the lidar system of the virtual autonomous vehicle of FIG. 3. Similarly, pixels at distance 397*d* indicate the distance of the base of building 397 as detected by the lidar system of the virtual autonomous vehicle of FIG. 3. Thus, each pixel in depth-map-realistic scene 390 may represent a particular distance or depth as would be experienced by a real-world camera or other sensor, such as a lidar device. As described, in virtual environments, the distance or depth into a scene or image (e.g., depth-map-realistic scene 390) is represented by each of the pixels (depth). The different color/RGB pixels at different vertical heights in the depth-map-realistic scene 390 may represent or simulate point cloud data and/or depth maps as used in real-world applications or environments.

In other embodiments, one or more color or RGB pixels of a depth-map-realistic scene (e.g., depth-map-realistic scene 390) may be associated with one or more corresponding simulated intensity or reflectivity values. An intensity value may correspond to the intensity of scattered light received at the lidar sensor, and a reflectivity value may correspond to the reflectivity of an object or surface in the virtual environment. In such embodiments, the intensity or reflectivity values may represent one or more virtual lidar sensors, e.g., of a virtual autonomous vehicle such as vehicle 700 or 760, which may simulate one or more real-world lidar sensors as described herein.

Physics component 106 may be configured to generate environment-object data defining how objects or surfaces interact with each other in the virtual environment. Environment-object data provides the feature training dataset(s) with high quality metric(s), e.g., of how a vehicle (e.g., vehicle 700 or 760) reacts to virtual environment stimuli. In various embodiments, environment-object data defines how a first object or surface interacts with a second object or surface within the virtual environment. For example, a first object or surface may be a virtual autonomous vehicle (e.g., vehicle 401, 451, 700, and/or 756 as described herein) operating within the virtual environment and a second object or surface may be a virtual pothole within the virtual environment. Environment-object data may be generated that details, or explains, how the virtual vehicle reacts to striking the pothole. In such an embodiment, for example, environment-object data may be physics based data such as force, speed, timing, damage, or other such metrics may be generated by physics component 106 detailing how the virtual autonomous vehicle reacts to physics. In some embodiments, the environment-object data may indicate or detail how parts of the car may react to such physical stimuli (e.g., striking the pothole 398). For example, an autonomous vehicle (e.g., vehicle 401, 451, 700, and/or 756 as described herein) may be associated with virtual or simulated shocks or sensors, which may record, or cause the recordation, of environment-object data when a car interacts with objects or surfaces within the virtual environment (e.g., strikes a pothole). In other words, the environment-object data may describe, or numerically explain, what happens to the autonomous vehicle as it interacts with objects or surfaces in its virtual environment. Further examples of environment-object data are described with respects to FIGS. 4A and 4B.

FIG. 4A illustrates another example photo-realistic scene 400 of a virtual environment in the direction of travel of an autonomous vehicle (e.g., vehicle 401) within the virtual environment, and further illustrates examples of various virtual objects associated with environment-object data defining how objects or surfaces interact with each other in the virtual environment in accordance with various embodiments disclosed herein. Such data may be used as training data, e.g., via training dataset(s), etc. to train machine models or self-driving control architectures as described herein. The example photo-realistic scene of FIG. 4A is generated in the same or similar fashion as described for FIG. 2A and, accordingly, the same or similar disclosure for the photo-realistic scene of FIG. 2A applies equally herein for the photo-realistic scene of FIG. 4A. FIG. 4A depicts various objects or surfaces that interact within the virtual environment of photo-realistic scene 400. Such objects or surfaces include virtual vehicle 401, from which the perspective of photo-realistic scene 400 is depicted. Photo-realistic scene 400 further includes surfaces with which virtual vehicle 401 may interact, including, but not limited to, roads 402 and 403, sidewalks 404 and 405 and crosswalk 406. Photo-realistic scene 400 further includes additional surfaces with which virtual vehicle 401 may interact, including, but not limited to, pedestrian 409, vehicles 412 and 414, traffic sign 415, traffic light 416, tree 417, and building 418. Other objects or surfaces with which virtual vehicle 401 may interact include intersection 407 and pothole 408.

In some embodiments, environment-object data may be generated for, and thus relate to, the motion of the autonomous vehicle 401 itself within the virtual environment. For example, in some embodiments, the motion of an autonomous vehicle (e.g., vehicle 401) may be defined by one or more of a position of the autonomous vehicle (e.g., vehicle 401), a velocity of the autonomous vehicle (e.g., vehicle 401), an acceleration of the autonomous vehicle (e.g., vehicle 401), or a trajectory of the autonomous vehicle (e.g., vehicle 401) as depicted in FIG. 4A.

In other embodiments, an autonomous vehicle simulator 108 (as further disclosed herein for FIG. 1) may be configured to control the autonomous vehicle within the virtual environment based on the environment-object data. For example, the autonomous vehicle simulator 108 may control the virtual autonomous vehicle in the environment of photo-realistic scene 400 in order to avoid obstacles (e.g., pothole 408), pedestrians (e.g., pedestrian 409), or other objects or surfaces (e.g., 401-418) as shown in photo-realistic scene 400.

FIG. 4A also depicts several configurable parameter setting options 420-436 that may be used (e.g., by a human via a computer user interface/display) to control or configure the condition of a virtual environment, e.g., the virtual environment of photo-realistic scene 400. Control of the condition of the virtual environment in turn controls generation of the type and/or kind environment-object data generated, e.g., by physics component 106. For example, parameter setting option 420 may be used to configure the conditions of the virtual environment of FIG. 4A. As depicted in FIG. 4A, selection of parameter setting option 420 causes a screen overlay of several parameter setting controls 422-429, which may be used to configure certain conditions of the virtual environment of FIG. 4A. For example, parameter setting control 422 may be used to set the date (e.g., Jun. 1, 2001), time (e.g., 4:20 PM), traffic condition (e.g., no traffic, light traffic, high traffic, etc.), temperature (e.g., 93 degrees), sun condition (e.g., bright), and/or contrast of the scene 400. Other parameter setting controls include weather parameter setting control 424, which may be used to configure the weather conditions (e.g., clear, overcast, partly cloudy, raining, hailing, snowing, etc.) of the virtual environment, speed parameter setting control 426 which may be used to configure the speed of the simulation and/or vehicle 401, sky time parameter setting control 428 which may be used to configure the degree of brightness of the sky, and time scale parameter setting control 429 which may be used to configure the scale at which images/scenes are experienced by vehicle 401. Changing the values of any one or more of these conditions or settings may influence the virtual sensors (e.g., cameras) of the virtual vehicle 401, and, thus may cause the generation or modification of various different types of environment-object data based on such conditions. Such control allows the automated training dataset generator 100 to generate rich, diverse, and various sets of disperse and different data (e.g., feature training dataset(s)) for the purpose of training machine learning models as described herein.

FIG. 4A also depicts several other configurable parameter setting options 430-436 for configuring other conditions of the virtual environment of scene 400 or settings of automated training dataset generator 100. For example, speed parameter setting option 430 may be used to configure the number of scenes (e.g., frames, such as 30-frames-per-second) generated by automated training dataset generator 100. In such an embodiment, scene 400 may represent one such scene of hundreds or thousands of scenes generated over a particular time span. Camera parameter setting option 432 may be used to configure which virtual camera (e.g., game camera) is the scene 400 is depicted from. For example, in the embodiment of FIG. 4A, scene 400 is generated from the perspective of the driver camera. Scenes parameter setting option 434 may be used to configure which type of scene the virtual environment will comprise. In the embodiment of FIG. 4A, scene 400 is a type of "downtown" scene generated by imaging engine 102. Config parameter setting option 436 may be used to configure which drive-type setting (e.g., "ManualNoSensors," "Partial Sensor operated," "Fully Automatic," etc.) the virtual vehicle is currently implementing. In the embodiment of FIG. 4A, the "ManualNoSensors" drive-type is set indicating that a user would control vehicle 401 through the virtual environment. If, for example, the Fully Automatic option were set, then vehicle 401 may operate in a fully autonomous mode, e.g., via virtual sensors and cameras as described herein. As for the parameter setting controls 422-429, changing the values of any one or more of the parameter setting options 420-436 may influence the virtual sensors or cameras of the virtual vehicle 401, and, may thus cause the generation or modification of various different types of environment-object data based on such conditions. Such control allows the automated training dataset generator 100 to generate rich, diverse, and various sets of disperse and different data (e.g., feature training dataset(s)) for the purpose of training machine learning models and/or self-driving control architectures as described herein.

In some embodiments, the automated training dataset generator 100 may include a configuration manager (not shown). The configuration manager may accept a predefined configuration defining configuration information for one or more objects or surfaces (e.g., objects or surfaces 401-418) within the virtual environment (e.g., the virtual environment of scene 400 from FIG. 4). In certain embodiments, the predefined configuration may comprise a configuration file.

The predefined configuration file may include a certain data format, for example, a JavaScript object notation (JSON) format. In various embodiments, configuration information may include spawning (e.g., starting) positions for one or more objects or surfaces (e.g., objects or surfaces 401-418) within the virtual environment (e.g., the virtual environment of scene 400 from FIG. 4). For example, configuration information may include a weight of a particular object or surface (e.g., vehicles 412 and/or 414), a number of sensors associated with a virtual vehicle (e.g., vehicle 401), or a location of sensors placed on the virtual vehicle (e.g., sensors associated with vehicle 401). Other examples of configuration information include specifying where vehicles (e.g., vehicles 412 and/or 414) and/or pedestrian(s) (e.g., pedestrian 409) are located within a virtual environment when the virtual environment is initially rendered. The configuration information may be used for testing a virtual environment and/or generating feature training dataset(s) for generation of machine learning models as described herein.

In some embodiments, objects or surfaces (e.g., 401-418 of FIG. 4A) may be automatically rendered or generated within a virtual environment (e.g., the virtual environment of scene 400) using geo-spatial data. Embodiments involving geo-spatial data may include using existing mapping services (e.g., Mapbox) and satellite images (e.g., from Google maps, etc.) to automatically render positions of roads, buildings, trees, etc. in a virtual environment (e.g., the virtual environment of scene 400).

In some embodiments automated training dataset generator 100 may include a geo-spatial component (not shown) configured to generate a virtual environment based on geo-spatial data. In various embodiments, geo-spatial data may define one or more positions of simulated objects or surfaces within a virtual environment. For example, as illustrated by FIG. 4A, in some embodiments simulated objects or surfaces (e.g., geo-spatial data) may include a virtual road or street (e.g., roads 402-403), a virtual building (e.g., building 418), a virtual tree or landscaping object (e.g., tree 417), a virtual traffic sign (e.g., traffic sign 415), a virtual traffic light (e.g., traffic light 416), a simulated pedestrian (e.g., pedestrian 409), or a simulated vehicle (e.g., vehicles 412 and 414). In such embodiments, such geo-spatial data may be rendered, or placed, within the virtual environment (e.g., the virtual environment of scene 400).

In some embodiments, geo-spatial data may include geo-spatial metadata. The geo-spatial metadata may include or expose detail parameters used by automated training dataset generator 100 (e.g., by the imaging engine 102) for generating the one or more simulated objects or surfaces (e.g., 401-418 of FIG. 4A) within the virtual environment. For example, in certain embodiments, such detail parameters may include a number of lanes for a road and a width for the road (e.g., as shown in FIG. 4A for roads 402 and 403). In another example embodiment, parameters may include elevation data for a particular simulated object or surface within the virtual environment (e.g., elevation for traffic light 416, building 418, etc.).

Together, geo-spatial data and its related metadata may be used by the automated training dataset generator 100 and/or geo-spatial component to render such data within a virtual environment into a detailed roadway that has realistic lanes and shoulders, etc. For example, in such embodiments, geo-spatial metadata may define a four-lane, two-way highway with a particular width and particular waypoints which may be rendered by the automated training dataset generator 100 and/or geo-spatial component into virtual four lane highway mesh suitable for simulation with a virtual environment (e.g., the virtual environment of scene 400).

In still further embodiments, the objects or surfaces generated via geo-spatial data and/or the geo-spatial component may include predefined images. In some instances, the predefined images may be sourced (e.g., downloaded) from a remote server (e.g., via computer network(s), such as network(s) 166), which such the predefined images are loaded into a virtual environment (e.g., the virtual environment of scene 400 of FIG. 4A). For example, any of the object or surfaces 401-418 of FIG. 4A may represent such predefined images.

Similarly, in additional embodiments, geo-spatial data may include real-world lidar based data. Such real-world lidar based data may, for example, be loaded into, and used to update and/or build, a virtual environment (e.g., the virtual environment of scene 400 of FIG. 4A). For example, lidar data may be used to determine or render actual elevation data of roads (e.g., roads 402 and/or 403), actual positions of traffic lights (e.g., traffic light 416), etc. within a virtual environment.

In still further embodiments, the geo-spatial component of automated training dataset generator 100 may update a virtual environment via a simultaneous localization and mapping (SLAM) technique. SLAM is a mapping and navigation technique that constructs and/or updates a map of an unknown environment while simultaneously keeping track of an agent's (e.g., vehicle's, such as vehicle 401 and/or 451) location within it. For example, in the embodiment of FIG. 4A, scene 400 may be constructed and/or updated based on map data (e.g., Google map data), such that the roads or streets that comprise the downtown scene depicted by scene 400 are constructed from such map data, but where the imaging engine 102 overlays or renders the objects or surfaces (e.g., objects or surfaces 401-418) on top of the map data to generate the whole of scene 400 of the virtual environment depicted in FIG. 4A. In a similar manner, the geo-spatial data component of automated training dataset generator 100 may construct and/or update the virtual environment via photogrammetry. Photogrammetry may include providing the automated training dataset generator 100 and/or geo-spatial component with one or more photographs, where the automated training dataset generator 100 and/or geo-spatial component determines or generates a map, a drawing, a measurement, or a 3D model of the scene(s) depicted by the one or more photographs. Such scene(s) may be used to generate, update, or form a basis for scene 400 of FIG. 4A (or other such scene(s) as described herein).

FIG. 4B illustrates a different scene of the virtual environment of FIG. 4A depicting various descriptors associated with objects or surfaces of the virtual environment. As for FIG. 4A, FIG. 4B depicts a photo-realistic scene 450 with a type of scene designated as "downtown" rendering, where an virtual autonomous vehicle (e.g., any of vehicles 401, 451, 700, and/or 760) would operate in, and thereby generate training data/dataset(s) for, an autonomous vehicle operating in a downtown environment having objects and surfaces typical of such environment. The example photo-realistic scene 450 of FIG. 4B is generated in the same or similar fashion as described for FIG. 2A, and, accordingly, the same or similar disclosure for the photo-realistic scene 450 of FIG. 2A applies equally herein for the photo-realistic scene 450 of FIG. 4B. As for scene 400, scene 450 is also depicted from the perspective of the driver, e.g., in this case the drive camera of vehicle 451. Scene 450 may represent an image or frame of a downtown virtual environment.

Photo-realistic scene 450 illustrates the application of descriptors to various environment-object data of various objects or surfaces with the virtual environment. In particular, various objects or surfaces include descriptors 451-482 that may indicate the type of objects or surfaces of the environment-object data that may interact with one another. In various embodiments, descriptor data (e.g., descriptors 451-482) may be included in training data/datasets to train machine learning models and/or self-driving control architectures for controlling autonomous vehicles as described herein. In some embodiments, each of the objects or surfaces may be associated with a tracking identifier (TID) (e.g., a unique identifier (ID)) that tracks objects and surfaces (e.g., vehicles) within each frame. In certain embodiments, a descriptor of each object or surface may include any one or more of the following: a unique identifier (ID) of the object or surface in the virtual environment, a category of the object or surface as defined within the virtual environment, a position value of the object or surface within the virtual environment, an orientation of the object or surface within the virtual environment, a velocity of the object or surface within the virtual environment, a reflectivity of the object or surface within the virtual environment, or a status of the object within the virtual environment. An orientation of an object or a surface may be represented by a surface normal vector (e.g., a vector that is orthogonal to the object or surface at a particular location or pixel on the object or surface).

In still further embodiments, a descriptor (e.g., any of descriptors 451-482) of an object or surface may include one or both of the following: an object class of an object or surface in the virtual environment or a future trajectory of an object or surface in the virtual environment. In this way, each object or surface within the virtual environment of FIG. 4B is pre-defined with various descriptors and/or attribute(s) defining the object or surface. For example, in some embodiments, each object or surface may have a category that indicates what the object or surface is (e.g., a vehicle, a tree, a sign). Some descriptors may indicate certain attributes of the object of surface (e.g., the sign is dirty, the sign is clean and shiny). Other descriptors may define a state estimate of an object or surface, such as a position or orientation of an object or surface within the virtual environment. Descriptors (e.g., descriptors 451-482) may be used to train machine learning models, where descriptors are trained against, or as, labels or features of the virtual world. Thus the virtual environment may include objects and surfaces with descriptors, each having a unique TID for identification purposes and certain attributes that cause a virtual vehicle operating within the virtual environment to act according to the attributes of the surface or object, and thus may be used to train machine learning models that may control autonomous vehicles.

For example, the descriptors 451-482 may be used to determine features or descriptors, e.g., feature training dataset(s) used to train machine learning models as described herein. As depicted in FIG. 4B, such descriptors include the vehicle 451 itself and other objects and surfaces that vehicle 451 may interact with. These include surfaces or objects such as lane markings 452 and 454, center lane marking 456, pothole 458, sidewalk 460, intersection 462, crosswalk 464, pole 470, tree 472, building 474, traffic light 476, pedestrian 480, and/or non-moving object (e.g., "NonMovingMisc") 482.

Each of the descriptors 451-482 may represent, mark, identify, or otherwise describe individual pixels, or multiple pixels, within photo-realistic scene 450 of FIG. 4B. Thus, the environment-object data generated (e.g., by physics component 106), based on interactions between the various objects or surfaces having descriptors (e.g., 451-482), may be as detailed as pixel-to-pixel interactions. For example, automated training dataset generator 100 may be generated numerous scenes, images, or frames of vehicle 451 approaching pothole 458. Each scene in the number of scenes may generate environment-object data (e.g., pixel data) indicative of an interaction of the vehicle 451 with the pothole 458. In one embodiment, the environment-object data generated may be associated with the vehicle 451 striking the pothole 458 causing shock or force (e.g., physics) environment-object data, e.g., generated by physics component 106. In another embodiment, such environment-object data (as previously generated by vehicle 451 striking the pothole 458) may be used to train a machine learning model that may be used to operate or control the vehicle 451 to avoid or maneuver around the pothole 458. In either embodiment, using descriptors for objects or surfaces (e.g., via descriptors 451-482) allows the automated training dataset generator 100 generated detailed, rich, and various datasets (e.g., feature training dataset(s)) defining characteristics or parameters that affect interactions between objects or surfaces within the virtual environment for the purpose of training machine learning models to control autonomous vehicles as described herein. It is to be understood that while FIG. 4B shows certain descriptors 451-482 for particular objects and surfaces, the embodiments contemplated herein are not limited such descriptors, surfaces, or objects, such that similar and/or additional embodiments are further contemplated for generation of feature training dataset(s) as described herein.

As depicted by FIG. 1, automated training dataset generator 100 may further include an autonomous vehicle simulator 108 configured to control an autonomous vehicle (e.g., vehicle 401, 451, 700, and/or 760) within the virtual environment based on one or both of (i) the plurality of photo-realistic scenes and (ii) the plurality of depth-map-realistic scenes. As depicted by FIG. 1, autonomous vehicle simulator 108 may receive, as input, from physics component 106 environment-object data as described herein. In addition, as depicted by FIG. 1, autonomous vehicle simulator 108 may receive, as input, from sensor simulator 104 simulated sensor data as described herein. The environment-object data and/or simulated sensor data may be used to control the autonomous vehicle (e.g., vehicle 401, 451, 700, and/or 760) within the virtual environment. Control of an autonomous vehicle (e.g., vehicle 401, 451, 700, and/or 760) via autonomous vehicle simulator 108 may cause the output of data/dataset(s) for use with training or generating machine learning models and/or self-driving control architectures as described herein.

In some embodiments, a virtual environment may include simple waypoint vehicles (e.g., vehicles 412 and/or 414 of FIG. 4A) and full-stack (e.g., fully autonomous) vehicles (e.g., vehicle 401) in the same simulation. In such embodiments, the waypoint vehicles (e.g., vehicles 412 and/or 414) may interact with the fully autonomous vehicles (e.g., vehicle 401, 451, 700, and/or 760) to generate feature training dataset(s) to develop machine learning models as described herein. For example, in some embodiments the automated training dataset generator 100 may further include a waypoint vehicle simulator (not shown) configured to control one or more waypoint vehicles within a virtual environment. In some embodiments, the waypoint vehicle simulator could be formed from multiple intelligent planning algorithms, including earlier versions of trained machine learning models, where the waypoint vehicle similar would generate or otherwise determine simple waypoint paths for the waypoint vehicle to travel or otherwise traverse along. For example, in some embodiments, each waypoint vehicle may follow a predetermined route within the virtual environment. Such waypoint vehicles may interact with an autonomous vehicle (e.g., vehicle 401, 451, 700, and/or 760) within the virtual environment, e.g., to provide traffic conditions and behaviors to the virtual environment with which full AV stack vehicles may interact with. For example, waypoint vehicles may follow, within the virtual environment (e.g., scenes 400 and/or 450), waypoints at speed limit, the purpose of which is to provide information to fully autonomous vehicles such that, in such embodiments, the waypoint vehicles act as simple background vehicles for the purpose of testing the full stack vehicles.

In certain aspects, the one or more waypoint vehicles may implement, via autonomous vehicle simulator 108, one or more driving strategies, which may include, e.g., a conservative driving strategy, an aggressive driving strategy, or a normal driving strategy. The different driving strategies may add variability to waypoint vehicle behavior thereby adding variability to any feature training dataset(s) generated from the autonomous vehicle interacting with the waypoint vehicle. In some embodiments, a machine learning model, as described herein, may be trained with reinforcement learning techniques based on vehicle operation data captured when the autonomous vehicle interacts with the one or more waypoint vehicles. For example, reinforcement learning may be used on full-stack autonomous vehicles to train such vehicle in environments having waypoint vehicles moving in predicable ways.

In other embodiments, autonomous vehicle simulator 108 may be further configured to apply or execute one or more driving strategies within a virtual environment (e.g., the virtual environment of FIG. 4A). In some embodiments, autonomous vehicle simulator 108 may implement the one or more driving strategies as configurable driving strategies. Such configurable driving strategies may include parameters, that when altered, update vehicle operation of autonomous vehicle(s) (e.g., vehicles 401 and/or 451) within the virtual environment. For example, configurable driving strategies may include driving strategies such as risky (e.g., speeding or hard breaking involved), safe (e.g., drives speed limit and obeys traffic signs, etc.), and/or common (e.g., a combination of risky and safe). Other driving strategies may include how to operate or simulate an autonomous vehicle (e.g., 401 and/or 451) within certain situations, such intersections, including irregular intersections (e.g., having roads not a right angles to each other with multiple traffic lights).

In some embodiments, a scenario simulator (not shown) may be configured to generate one or more simulated environment scenarios, wherein each of the simulated environment scenario(s) corresponds to a variation of a particular object, surface, or situation within the virtual environment. A particular object, surface, or situation may include, for example, a road (e.g., 402 or 403), an intersection (e.g., 407), a stop sign, or a traffic light (e.g., 416). For example, in one embodiment, automatic generation of simulated scenarios may include generation of variations on scenarios including traffic signage, e.g., the generation of thousands of different stop signs with weeds or other obstructions in front of them to determine how an autonomous vehicle (e.g., vehicle 401) would react to such variation with in the virtual environment. In still further embodiments, a particular object, surface, or situation is may be a pedestrian's activity within the virtual environment (e.g., of pedestrian 409) or a railroad arm's behavior within the virtual environment. Accordingly, such embodiments, as associated with the scenario simulator, may include the automatic generation of simulated situations, e.g., various vehicle, surface, and/or object situations that may provide diversity and or variability with respect to the generation of feature training dataset(s) of a virtual environment e.g., for training machine learning models as described herein.

In some embodiments, simulated scenarios may be generated by the scenario simulator via procedural generation ("proc gen") or other techniques, including machine learning models, such as generative adversarial networks (GANs). For example, at least portion of the virtual environment depicted in scene 400 may be generated via a plurality of generative machine learning models. In such embodiments, at least one of the plurality of generative machine learning may be a GAN. A GAN-based approach may involve artificial intelligence algorithm(s) implementing unsupervised machine learning. The algorithms may include two neural networks contesting with each other to generate or determine feature training data(s) or other information within a virtual environment (e.g., the virtual environment of FIG. 4A). For example, a GAN may include a first algorithm and a second algorithm where the first algorithm and second algorithm compete analyzing a sample dataset (e.g., of vehicle simulation data or situation data) and inflate the sample dataset into a larger set for training purposes. In some embodiments, a GAN based approach may be used to generate a virtual environment by generating different objects or surfaces, e.g., multiple variations of intersections with traffic lights, etc. in order to generate different virtual environments for testing different road, traffic, or other environmental conditions. In certain embodiments, at least a portion of the virtual environment generated by or determined with the GAN may be generated or determined based on data collected by real-world sensors associated with real-world vehicles. In various embodiments, the first algorithm and the second algorithm of the GAN-based approach may be set to compete on across different metrics, e.g., generating more dangerous simulated scenarios (e.g., more narrow roads), safer simulated scenarios (e.g., more traffic lights and/or signals), or the like. Multiple metrics may be defined on which the first algorithm and the second algorithm of the GAN-based approach may complete. In this way, the first algorithm and the second algorithm of the GAN-based approach may generate specific simulated scenarios and/or virtual environments that may be used to test and generate feature training data across a multitude of autonomous driving scenarios.

As depicted by FIG. 1, automated training dataset generator 100 may further include a sensor simulator 104 configured to generate simulated sensor data within a virtual environment (e.g., any of the virtual environment(s) depicted and described for FIGS. 2A, 2B, 3, 4A, and/or 4B). The simulated sensor data may be associated with one or more objects or surfaces (e.g., 202-230, 292-296, 391-398, 401-418, and/or 451-482) in the virtual environment. The simulated sensor data may include any of simulated lidar data, simulated camera, simulated thermal data, and/or any other simulated sensor data simulating real-world data that may be generated by, or captured by, real-world sensors. In some embodiments, the simulated sensor data may be accessed via direct memory access (DMA). DMA may be used to retrieve simulated sensor data from game engine virtual cameras. In such embodiments, the DMA may be implemented using asynchronous DMA access. Accessing simulated data via DMA may optimize, or make more efficient, accessing memory (e.g., by accessing the memory directly) instead of using standard API function calls to game engines (e.g., using the "getTexture" API function call to the Unity game engine).

In some embodiments, the sensor simulator 104 may position one or more virtual sensors in a virtual environment (e.g., any of the virtual environment(s) depicted and described for FIGS. 2A, 2B, 3, 4A, and/or 4B). In such embodiments, the virtual sensor(s) may be configured to generate the simulated sensor data.

In other embodiments, the sensor simulator 104 may generate the sensor data via ray casting. Ray casting may include a rendering technique to create a 3D perspective of a scene of a virtual environment. Ray casting may include casting a virtual ray, from a point of origin in a scene in direction against colliders (e.g., objects or surfaces) in the scene. Ray casting may be performed, for example, for validation purposes (e.g., to validate depths, etc.). In some aspects the, sensor simulator 104 may generate simulated lidar data or simulated radar data.

In further embodiments, the sensor simulator 104 may generate the sensor data based on the depth-map-realistic scenes. In some aspects, the sensor simulator may generate the sensor data using a graphic shader, e.g., such as a graphic shader of a gaming engine.

In some embodiments, a particular object or surface may be associated with a reflectivity value within a virtual environment, and the sensor simulator 104 may generate at least a portion of the sensor data (e.g., virtual lidar data) based on the reflectivity value. In such embodiments, the reflectivity value is derived from a color of the particular object or surface. For example, a reflectivity value may be derived from color of object, where brighter objects have higher reflectively values. This may be based on albedo properties and/or basic light properties such as, in the real-world, white objects reflects all color light (i.e., reflects all light spectrums), but black objects absorb all color light). Basing reflectivity values on colors in a virtual environment allows a variability of color so that objects may be detected differently by sensors of an autonomous vehicle (e.g., vehicle 401 and/or 451) in the virtual environment (e.g., black car and black shirt person may be seen by infrared and not regular colors). In still further embodiments, the reflectivity value is derived from a normal angle to a position of a virtual sensor, e.g., within the virtual environment.

Automated training dataset generator 100 may further include a dataset component 110 configured to generate one or more feature training datasets based on at least one of (i) the plurality of photo-realistic scenes, (ii) the plurality of depth-map-realistic scenes, or (iii) the environment-object data. For example, pixel data or other such information of a virtual environment (e.g., any of the virtual environment(s) depicted and described for FIGS. 2A, 2B, 3, 4A, and/or 4B), as captured from photo-realistic scenes, depth-map-realistic scenes, or other images described herein (e.g., FIGS. 2A, 2B, 3, 4A, and/or 4B), may be used as features, labels, or other data, e.g., as part of feature training dataset(s), to train machine learning models and/or self-driving control architectures (SDCAs) as described herein.

In various embodiments, pixel data or information of the imaging scenes and/or virtual environments disclosed herein simulates or mimics pixel data captured from, and or generated by, real-world cameras or other sensors. For example, as described in U.S. Provisional Patent Application Ser. No. 62/573,795 entitled "Software Systems and Methods for controlling an Autonomous Vehicle," which was filed on Oct. 28, 2017, the entire disclosure of which is hereby incorporated by reference, a real-world lidar system of a vehicle (e.g., of vehicles 700 or 760) may be used to determine the distance to one or more downrange targets, objects, or surfaces. The lidar system may scan a field of regard to map the distance to a number of points within the field of regard. Each of these depth-mapped points may be referred to as a pixel. A collection of pixels captured in succession (which may be referred to as a depth map, a point cloud, or a point cloud frame) may be rendered as an image or may be analyzed to identify or detect objects or to determine a shape and/or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction. Accordingly, each pixel may be associated with a distance (e.g., a distance to a portion of a target, object, or surface from which the corresponding laser pulse was scattered) or one or more angular values. Thus, the pixel data or information of the imaging scenes and/or virtual environments disclosed herein simulates or mimics pixel data captured from, and or generated by, real-world cameras or other sensors, and thus can be used to effectively train machine learning models applicable to real-world driving applications, such as real-world autonomous vehicles operating in real-world environments.

In some embodiments, virtual data and real-world data may be combined for purposes of generating feature training dataset(s) and/or for generating machine learning model(s) for operation of real or virtual autonomous vehicle(s). For example, one or more virtual objects (e.g., a virtual road or street, a virtual building, a virtual tree, a virtual traffic sign, a virtual traffic light, a virtual pedestrian, a virtual vehicle, or a virtual bicycle) may be superimposed onto real-world sensor data to generate a training dataset. As another example, real-world sensor data and simulated sensor data may be combined, and in some instances, normalized using a same format (e.g., having same data fields). In some embodiments, for example, dataset component 110 of automated training dataset generator 100 may be configured to generate at least one real-world training dataset. The real-world data may include real-world environment-object data as captured by one or more sensors (e.g., accelerometers, gyroscopes, motion sensors, or GPS devices) associated with a real-world vehicle, or as derived from such sensor data (e.g., in some embodiments, real-world environment-object data could be derived or determined indirectly or calculated from sensor data). The real-world training dataset may be based on real-world data and may be normalized with respect to one or more feature training datasets (e.g., one or more feature training datasets data formats). In such embodiments, the real-world training dataset may be associated with training a machine learning model to control an autonomous vehicle in a real-world autonomous driving application. In some embodiments, the real-world data may include a real-world photo-realistic scene as captured by a two-dimensional (2D) camera. In still further embodiments, the real-world data may include a real-world depth-map realistic scene as captured by a three-dimensional (3D) sensor. In such embodiments, the three-dimensional (3D) sensor may be a lidar-based sensor.

Feature training dataset(s) as generated by automated training dataset generator 100 may be used to train a machine learning model to control an autonomous vehicle in a real-world autonomous driving application. In some embodiments, the feature training dataset(s) may be stored in memory 152. The machine learning model may be trained, for example, via the processor(s) 150 executing one or more machine learning algorithms using the feature training dataset(s), stored in memory 152 or read directly from dataset component 110, input (e.g., used as features and labels) to the one or more machine learning algorithms.

The machine learning model, as trained with the training dataset(s) as generated by the automated training dataset generator 100, may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in data (such as pixel or other data or information in of the imaging scenes, e.g., photo-realistic scenes, depth-map-realistic scenes, or other such information as described herein) in order to facilitate making predictions for subsequent data (to predict or determine actions and behaviors of objects or surfaces in an environment for the purpose of controlling an autonomous vehicle in a real-world autonomous driving application in that environment).

Machine learning model(s), such as those trained using feature training dataset(s) as generated by automated training dataset generator 100, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. For example, in at least some embodiments, virtual environments as described herein may include various labels and relate features that may be used in training data (see, e.g., FIGS. 4A and 4B). Such rules, relationships, or models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example, multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

A machine learning model, as used herein to control an a real-world autonomous vehicle, may be trained using pixel data, label data, or other such information associated with an imaging scene, e.g., photo-realistic scenes, depth-map-realistic scenes, or other such information as described herein, as feature and/or label data. The machine learning models may then be implemented as, or as part of, a self-driving control architecture (SDCA) to control a real-world autonomous vehicle as further described herein.

Figure 5:
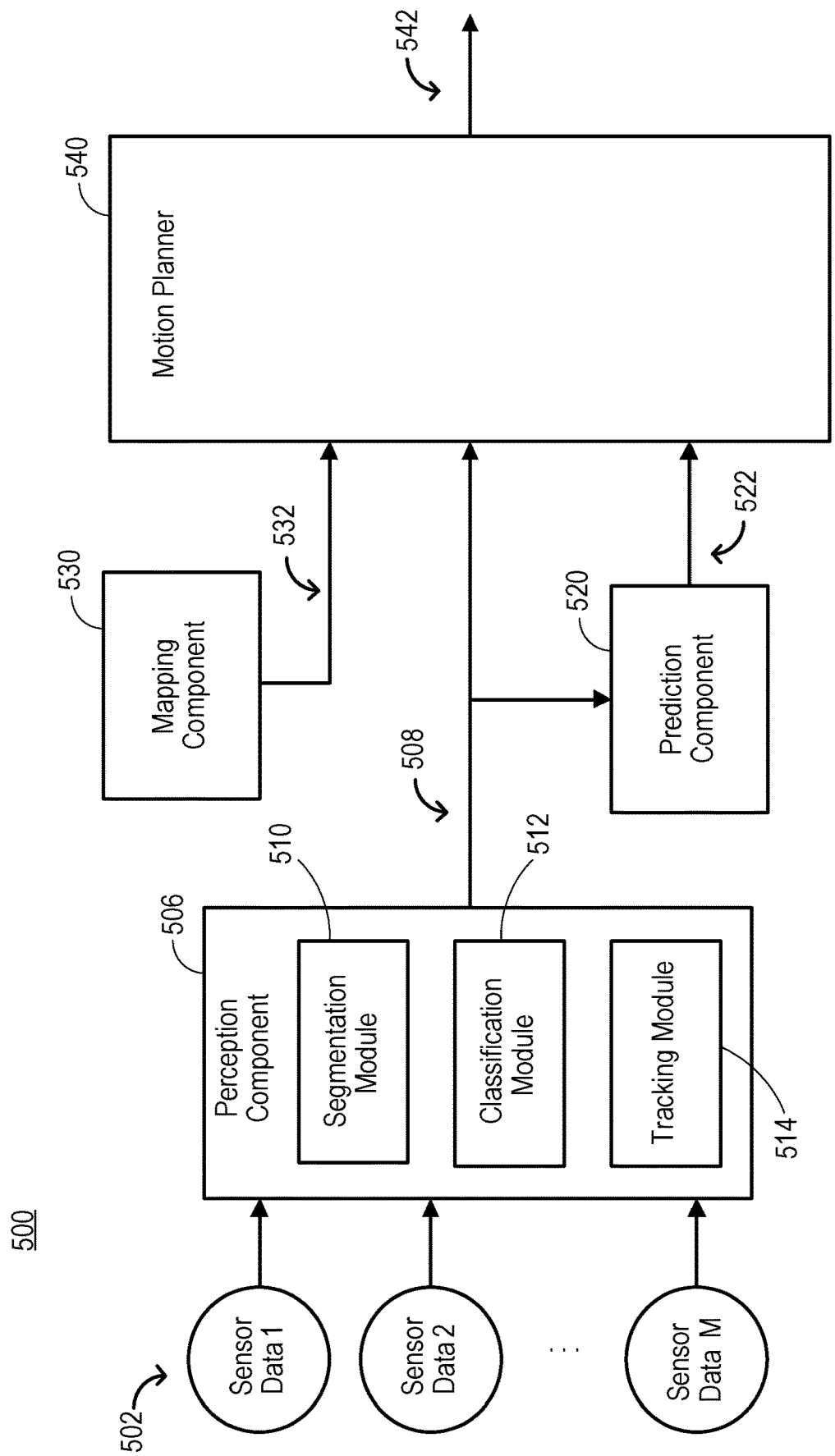
FIG. 5 is a block diagram of an example self-driving control architecture (SDCA) using one or more machine learning model(s) trained with feature training dataset(s) generated via virtual environments in accordance with various embodiments herein.

FIG. 5 is a block diagram of an example self-driving control architecture (SDCA) 500 using one or more machine learning model(s) trained with feature training dataset(s) generated via virtual environments in accordance with various embodiments herein. SDCA 500 may be utilized as a SDCA for a virtual or real-world vehicle (e.g., as represented by any of vehicles 401, 451, 700, and/or 761), e.g., as a stand-alone SDCA, or in another suitable software architecture. In the embodiment of FIG. 5, the SDCA 500 receives as input M sets of sensor data 502 generated by M different sensors, with M being any suitable integer equal to or greater than one. The sensor data 502 may correspond to a portion, or all, of the sensor data generated, simulated, or determined as described herein with respect to virtual environments (e.g., virtual environments of FIGS. 4A and/or 4B) As just one example, "sensor data 1" may include frames of point cloud or other data generated by a first lidar device or simulation, "sensor data 2" may include frames of point cloud or other data generated by a second lidar device or simulation, "sensor data 3" (not shown in FIG. 5) may include frames of digital images generated by a camera or simulator, and so on. As discussed herein, the sensors may include one or more lidar devices, cameras, radar devices, thermal imaging units, IMUs, and/or other sensor types, whether real or virtual.

Control of a real-world autonomous vehicle may involve a machine learning model, as trained in accordance with the disclosure herein, to predict, detect, and/or track various objects or surfaces experienced in a virtual environment (such as the environments illustrated by each of FIGS. 2A, 2B, 3, 4A, and/or 4B) or in a real-world environment. For example, in some embodiments, the feature training dataset, as generated by automated training dataset generator 100, may be associated with training a machine learning model to detect, classify and/or track (e.g., via perception component 506 of FIG. 5) one or more objects within the virtual environment or the real-world environment. In other embodiments the feature training dataset may be associated with training a machine learning model to detect, classify, and/or track one or more vehicle lanes within the virtual environment or the real-world environment. In still further embodiments, the feature training dataset may be associated with training a machine learning model to detect, classify, and/or track one or more road-free spaces within the virtual environment or the real-world environment. In other embodiments, the feature training dataset may be associated with training a machine learning model to detect, classify, and/or track one or more vehicle lanes within the virtual environment or the real-world environment. In still further embodiments, the feature training dataset may be associated with training the machine learning model to predict, for an object within the virtual environment or the real-world environment, one of future object behavior, object intent, or future object trajectory. In other embodiments, the feature training dataset may be associated with training a machine learning model to estimate a depth based on one or more virtual cameras within the virtual environment. The virtual cameras may correspond to one or more two-dimensional cameras and/or one or more three-dimensional cameras. With respect to the SDCA embodiment of FIG. 5, certain models may be trained using such data, including, but not limited to, training an object identification model in Segmentation Module 510, a classification model in Classification Module 512, a tracking model in Tracking Module 514, a prediction model in Prediction Component 520, or a motion planner model in Motion Planner 540.

The sensor data 502 is input to a perception component 506 of the SDCA 500, and is processed by the perception component 506 to generate perception signals 508 descriptive of a current state of the autonomous vehicle's environment, whether virtual or real-world. It is understood that the term "current" may actually refer to a very short time prior to the generation of any given perception signals 508, e.g., due to the short processing delay introduced by the perception component 506 and other factors. To generate the perception signals, the perception component may include a segmentation module 510, a classification module 512, and a tracking module 514.

The segmentation module 510 is generally configured to identify distinct objects within the sensor data representing the sensed environment. Depending on the embodiment and/or scenario, the segmentation task may be performed separately for each of a number of different types of sensor data, or may be performed jointly on a fusion of multiple types of sensor data. In some embodiments where lidar devices are used, the segmentation module 510 analyzes point cloud or other data frames to identify subsets of points within each frame that correspond to probable physical objects or surfaces in the environment. In other embodiments, the segmentation module 510 jointly analyzes lidar point cloud or other data frames in conjunction with camera image frames to identify objects in the environment. Other suitable techniques, and/or data from other suitable sensor types, may also be used to identify objects or surfaces. It is noted that, as used herein, references to different or distinct "objects" or "surfaces" may encompass physical things that are entirely disconnected (e.g., with two vehicles being two different "objects"), as well as physical things that are connected or partially connected (e.g., with a vehicle being a first "object" and the vehicle's hitched trailer being a second "object").

The segmentation module 510 may use predetermined rules or algorithms to identify objects. For example, the segmentation module 510 may identify as distinct objects, within a point cloud, any clusters of points that meet certain criteria (e.g., having no more than a certain maximum distance between all points in the cluster, etc.). Alternatively, the segmentation module 510 may utilize a neural network that has been trained to identify distinct objects or surfaces within the environment (e.g., using supervised learning with manually generated labels for different objects within test data point clouds, etc.), or another type of machine learning based model. For example, the machine learning model associated with segmentation module 510 could be trained using virtual sensor (e.g., lidar and/or camera) data from a virtual environment/scene as described herein (e.g., virtual environments/scenes as described for any of FIGS. 2A-4B). Further example operation of the segmentation module 510 is discussed in more detail in FIG. 2B, for an embodiment in which the perception component 506 processes point cloud data.

The classification module 512 is generally configured to determine classes (labels, descriptors, categories, etc.) for different objects that have been identified by the segmentation module 510. Like the segmentation module 510, the classification module 512 may perform classification separately for different sets of the sensor data 502, or may classify objects based on data from multiple sensors, etc. Moreover, and also similar to the segmentation module 510, the classification module 512 may execute predetermined rules or algorithms to classify objects, or may utilize a neural network or other machine learning based model to classify objects. For example, in some embodiments, machine learning model(s) may be trained for classification module 512 using virtual sensor data as described herein. In further example embodiments, virtual data output by a virtual version of segmentation module 510 may be used to train a machine learning model of classification module 512. Further example, operation of the classification module 512 is discussed in more detail in FIG. 2B, for an embodiment in which the perception component 506 processes point cloud or other data.

The tracking module 514 is generally configured to track distinct objects or surfaces over time (e.g., across multiple lidar point cloud or camera image frames). The tracked objects or surfaces are generally objects or surfaces that have been identified by the segmentation module 510, but may or may not be objects that were classified by the classification module 512, depending on the embodiment and/or scenario. The segmentation module 510 may assign identifiers and/or descriptors to identified objects or surfaces, and the tracking module 514 may associate existing identifiers with specific objects or surfaces where appropriate (e.g., for lidar data, by associating the same identifier with different clusters of points, at different locations, in successive point cloud frames). Like the segmentation module 510 and the classification module 512, the tracking module 514 may perform separate object tracking based on different sets of the sensor data 502, or may track objects based on data from multiple sensors. Moreover, and also similar to the segmentation module 510 and the classification module 512, the tracking module 514 may execute predetermined rules or algorithms to track objects or surfaces, or may utilize a neural network or other machine learning model to track objects. For example, in some embodiments, a machine learning model for tracking module 514 may be trained using virtual sensor data. In additional embodiments, virtual data may be used as output by a virtual version of classification module 512 to train a machine learning model of tracking module 514.

The SDCA 500 also includes a prediction component 520, which processes the perception signals 508 to generate prediction signals 522 descriptive of one or more predicted future states of the autonomous vehicle's environment. For a given object, for example, the prediction component 520 may analyze the type/class of the object (as determined by the classification module 512) along with the recent tracked movement of the object (as determined by the tracking module 514) to predict one or more future positions of the object. As a relatively simple example, the prediction component 520 may assume that any moving objects will continue to travel on their current direction and with their current speed, possibly taking into account first or higher-order derivatives to better track objects that have continuously changing directions, objects that are accelerating, and so on. In some embodiments, the prediction component 520 also predicts movement of objects based on more complex behaviors. For example, the prediction component 520 may assume that an object that has been classified as another vehicle will follow rules of the road (e.g., stop when approaching a red light), and will react in a certain way to other dynamic objects (e.g., attempt to maintain some safe distance from other vehicles). The prediction component 520 may inherently account for such behaviors by utilizing a neural network or other machine learning model, for example. For example, in some embodiments, a machine learning model for prediction component 520 may be trained using virtual sensor data. In additional embodiments, virtual data may be used as output by a virtual version of perception component 506 to train a machine learning model of prediction component 520. The prediction component 520 may be omitted from the SDCA 500, in some embodiments.

In some embodiments, the perception signals 508 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 512, possibly with an "unknown" class for certain pixels that were not successfully classified. Similarly, the prediction signals 522 may include, for each such grid generated by the perception component 506, one or more "future occupancy grids" that indicate predicted object positions, boundaries and/or orientations at one or more future times (e.g., one, two, and five seconds ahead). Occupancy grids are discussed further below in connection with FIGS. 6A and 6B.

A mapping component 530 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 532. In some embodiments, the mapping and navigation signals 532 include other map or location-related information, such as speed limits, traffic indicators, and so on. The navigation signals 532 may be obtained from a remote server (e.g., via a network, or, in the event of a real-world implementation, from a cellular or other communication network of the autonomous vehicle, or of a smartphone coupled to the autonomous vehicle, etc.), and/or may be locally stored in a persistent memory of the autonomous vehicle or other computing devices (e.g., graphics platform 101 and memory 152).

A motion planner 540 processes the perception signals 508, the prediction signals 522, and the mapping and navigation signals 532 to generate decisions 542 regarding the next movements of the autonomous vehicle. Depending on the type of the motion planner 540, the decisions 542 may be operational parameters (e.g., braking, speed, and steering parameters) or particular maneuvers (e.g., turn left, move to right lane, move onto shoulder of road, etc.). Decisions 542 may be provided to one or more operational subsystems of the autonomous vehicle (e.g., if decisions 542 indicate specific operational parameters), or may be provided to one or more intermediate stages that convert the decisions 542 to operational parameters (e.g., if the decisions indicate specific maneuvers).

The motion planner 540 may utilize any suitable type(s) of rules, algorithms, heuristic models, machine learning models, or other suitable techniques to make driving decisions based on the perception signals 508, prediction signals 522, and mapping and navigation signals 532. For example, in some embodiments, a machine learning model for motion planner 540 may be trained using virtual sensor data. In additional embodiments, virtual data may be used as output by a virtual version of any of mapping component 530, perception component 506, and/or prediction component 520, to train a machine learning model of motion planner 540. For example, the motion planner 540 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on.

Referring back to FIG. 2B, distinct ones of the objects 294 within the point cloud 290 may be identified by the segmentation module 510. For example, the segmentation module 510 may detect substantial gaps and/or other discontinuities in the scan lines of the ground plane 294, and identify groups of points in the vicinity of those discontinuities as discrete objects. The segmentation module 510 may determine which points belong to the same object using any suitable rules, algorithms, or models. Once the objects 294 are identified, the classification module 512 may attempt to classify the objects, and the tracking module 514 may attempt to track the classified objects (and, in some embodiments/scenarios, unclassified objects) across future point clouds similar to point cloud 290 (i.e., across multiple point cloud frames). Segmentation may also be performed with respect to depth-map-realistic scene of FIG. 3, where segmentation is determined based on depths or distances of objects (e.g., pothole 398 or vehicle 393) within the scene.

For various reasons, it may be more difficult for the segmentation module 510 to identify certain objects 296, and/or for the classification module 512 to classify certain objects 296, within the point cloud 290. As can also be seen in FIG. 2B, for example, a median wall 296A may be relativity easy to identify and classify due to the high density of points as well as the "shadow" (i.e., absence or relative scarcity of points) that the wall 296A creates. A truck 296B may also be relatively easy to identify as an object, due to the high density of points (and possibly the shape of its shadow), but may not be as easy to classify due to the fact that large portions of the truck 296B are hidden within the lidar shadow. The vehicle 296C may be relatively easy to identify as an object, but more difficult to classify due to the lack of points within the lidar shadow created by the median wall 296A (i.e., along the lower portions of the vehicle 296C). The vehicle 296D may be more difficult to identify as a distinct object due to the scarcity of points at the greater distance from the autonomous vehicle, as well as the close proximity between the points corresponding to the vehicle 296D and points of other, nearby objects. Still other objects may be difficult to identify, classify, and/or track due to their small size and/or low profile. For example, while not shown in FIG. 2B, the segmentation module 510 may identify (and the classification module 512 may classify) lane markings within the point cloud 290. The lane markings may appear as small but abrupt deviations in the path of the scan lines, for example, with those deviations collectively forming a line pattern that aligns with the direction of travel of the autonomous vehicle (e.g., approximately normal to the curve of the scan lines).

Despite such difficulties, the segmentation module 510, classification module 512, and/or tracking module 514 may use techniques that make object identification, classification and/or tracking highly accurate across a very wide range of scenarios, with scarce or otherwise suboptimal point cloud or other data representations of objects. For example, as discussed above in connection with FIG. 5, the segmentation module 510, classification module 512, and/or tracking module 514 may include neural networks that were trained using data/dataset(s) as described herein (e.g., labeled or described/descriptor scenes) corresponding to a very large number of diverse environments/scenarios (e.g., with various types of objects at different distances, in different orientations, with different degrees of concealment, in different weather and/or lighting conditions, and so on).

Example Sensor Parameter Optimizer In some embodiments, a non-transitory computer-readable medium, storing thereon instructions executable by one or more processors, may be configured to implement a sensor parameter optimizer 112 that determines parameter settings for use by real-world sensors in autonomous driving applications. For example, sensor parameter optimizer 112, as shown in FIG. 1 as part of automated training dataset generator 100, may generate enhanced parameters for use by a real-world sensor in autonomous driving applications, where the enhanced parameters are based on simulated data. The enhanced parameters may be generated, for example, via processor(s) 150 in execution with GPU(s) 154 and/or other components of automated training dataset generator 100, as described herein.

In some embodiments, the sensor parameter optimizer 112 may be used for virtual autonomous driving applications in a virtual environment (e.g., scenes 400 or 450 described herein) in order to train, test, generate or otherwise determine enhanced parameters for use by a real-world sensor (or virtual sensor) in autonomous driving applications. In still further embodiments, parameter settings for use by virtual or real-world sensors may be determined, via sensor parameter optimizer 112, by one or more machine learning models or self-driving control architectures, where, for example, a number of various parameter settings are tested against operation of a vehicle (e.g., any of vehicles 401, 451, 700, and/or 760) in a real or virtual environment to determine parameters that cause the vehicle to operate in a desired manner (e.g., operate in a safe manner or operate in accordance with a ground truth).

Sensor parameter optimizer 112 may include, or use, an imaging engine (e.g., imaging engine 102) configured to generate a plurality of imaging scenes (e.g., scenes 400 or 450) defining a virtual environment.

Sensor parameter optimizer 112 may further include, or use, a sensor simulator (e.g., sensor simulator 104) configured to receive a parameter setting for each of one or more virtual sensors (e.g., virtual sensors associated with any of vehicles 401, 451, 700, and/or 760). The parameter setting may have different types. For example, the parameter setting may define a spatial distribution of scan lines of a point cloud (e.g., as described and depicted for FIG. 2B herein), a field of regard (e.g., the focus or center thereof, of the vertical and/or horizontal width, etc.), a range, or a location of a sensor associated with the autonomous vehicle. The parameter setting may also define one or more location(s) of sensors placed around the vehicle (e.g., as depicted and described for FIGS. 7A and 7B). The parameter setting may include settings of multiple devices, e.g., such that the sensor parameter optimizer 112 would be able to experiment with a lesser ranging sensor facing backwards but a longer ranging sensor facing forwards, where the sensors are installed in a virtual vehicle (e.g., as depicted and described for FIGS. 7A and 7B). In some embodiments, the parameter setting may be a user-configured parameter setting.

Sensor simulator 104 may generate, based on the parameter settings and the plurality of imaging scenes (e.g., scene 400 of FIG. 4A and/or scene 450 of FIG. 4B) sensor data indicative of current states of the virtual environment. For example, current states of the virtual environment (e.g., of FIGS. 4A and/or 4B) may include realistic simulation of environmental artifacts such as defects in what a real-world lidar platform would experience, e.g., overly bright objects or surfaces having bloom, reflectivity values of different wavelengths of an object (e.g., where a same object or surface looks different in infrared light, visible light, etc.). Accordingly, in some embodiments, particular objects or surfaces may be associated with respective reflectivity value(s) within a virtual environment (e.g., a virtual environment of FIGS. 4A and/or 4B), where sensor simulator 104 may generate at least a portion of sensor data of the virtual environment based on such reflectivity value(s). For example, in some embodiments, reflectivity value(s) may be derived from one or more colors of the particular objects or surfaces.

In certain embodiments, sensor data may be generated by sensor simulator 104 via ray casting. For example, sensor simulator 104 may be configured to detect objects or surfaces within a virtual environment (e.g., by casting rays against such objects or surfaces and determining respective distances and/or depths within the virtual environment). In still further embodiments, sensor simulator 104 may simulate sensor data using a graphic shader (e.g., using imaging engine 102). In other embodiments, sensor simulator 104 may generate simulated lidar or radar data.

Sensor parameter optimizer 112 may also include, or use, an autonomous vehicle simulator (e.g., autonomous vehicle similar 108) configured to control an autonomous vehicle (e.g., vehicles 401 and/or 451) within the virtual environment (e.g., the virtual environment(s) depicted by each of FIGS. 4A and 4B) based on the sensor data. In some embodiments, sensor data may be accessed via direct memory access (DMA) in order to optimize, or speed the simulation of, generation of, or access to sensor data. For example, sensor parameter optimizer 112 may use DMA to efficiently capture depth maps and texture data, which the sensor data may comprise.

In various aspects, sensor parameter optimizer 112 may determine, based on operation of the autonomous vehicle (e.g., vehicles 401, 451, 700, and/or 760), an optimal parameter setting of the parameter setting where the optimal parameter setting may be applied to a real-world sensor associated with real-world autonomous driving applications. For example, optimal parameters of real-world sensor(s) (e.g., regarding scan patterns, field of view, range, etc.) may be based on simulation performance determined and experienced in a virtual environment based on different choices on the limitations of the sensor(s). In some embodiments, the optimal parameter setting may be determined, by sensor parameter optimizer 112, via evolutionary learning based on vehicle operation data captured when an autonomous vehicle (e.g., vehicles 401 and/or 451) interacts with one or more objects or surfaces (e.g., 402-418 and/or 452-482) with a virtual environment (e.g., virtual environments of FIGS. 4A and/or 4B). The evolutionary learning technique may be, at least in some embodiments, a reinforcement learning technique as described herein. In some embodiments, the optimal parameter may be determined while a sensor or autonomous vehicle is operating within the virtual environment, or the optimal parameter may be determined at a later time after data for the sensor or autonomous vehicle operating within the virtual environment has been collected. For example, the performance of a sensor with a particular parameter setting may be evaluated or measured while the sensor is operating in a virtual environment. Alternatively, multiple different parameter settings may be applied to a sensor operating in a virtual environment, and the performance of the sensor may be evaluated or measured offline at a later time.

Example Occupancy Grid Generator

Figure 6A:
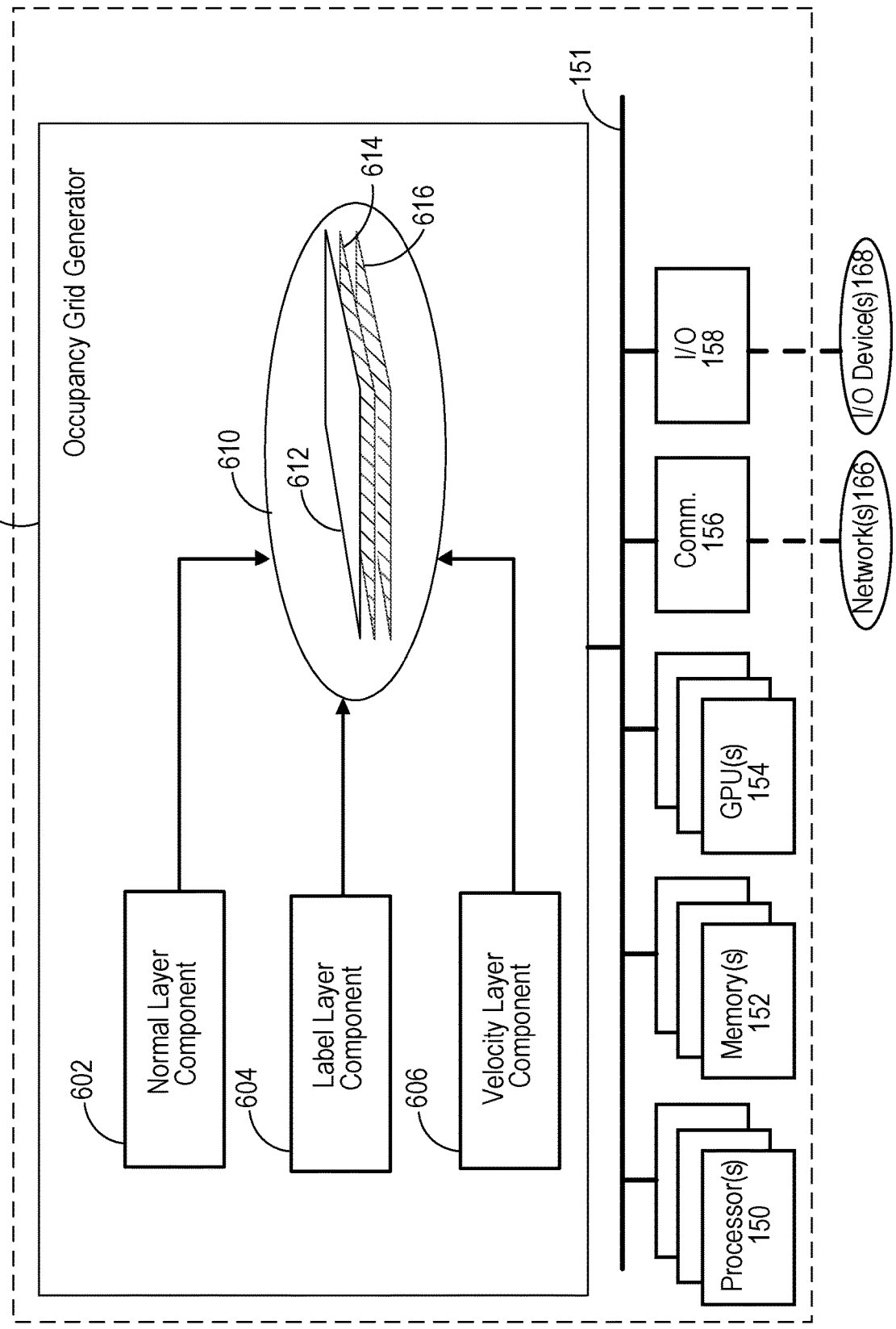
FIG. 6A is a block diagram of an example occupancy grid generator in accordance with various embodiments disclosed herein.

FIG. 6A is a block diagram of an example occupancy grid generator 600 in accordance with various embodiments disclosed herein. Generally, an occupancy grid may be generated from data of an environment (e.g., virtual environment of FIGS. 4A and/or 4B). An occupancy grid may involve converting a sensed (real or virtual) world geometry into a simplified top-down color indexed bitmap. In some embodiments, an occupancy grid may be encoded as multichannel image (e.g., an RGB image). In addition, an occupancy grid may include one or more layers at different levels or channels, where each layer may define different information. Each of the layers may be read, or used, by a computing device, machine learning model, SDCA, etc., in a highly efficient manner, because the layers of the occupancy grid may represent simplified information of a virtual or real-world environment or scene.

With reference to FIG. 6A, in various embodiments, a non-transitory computer-readable medium, storing thereon instructions executable by one or more processors (e.g., processor(s) 150 or 802 as described herein), may implement occupancy grid generator 600 for generating an occupancy grid indicative of an environment (e.g., virtual environment of FIGS. 4A and/or 4B) of a vehicle (e.g., vehicles 401 and/or 451) from an imaging scene (e.g., scene 400 or 450) that depicts the environment. In some embodiments, the imaging scene of the virtual environment may be a frame in a set of frames, where the set of frames define the operation of the virtual vehicle within the virtual environment. The set of frames may form a video of the virtual vehicle operating in the virtual environment. The environment may be a virtual environment for a virtual vehicle (e.g., vehicles 401 and/or 451). The environment, in other embodiments, may also be a real-world environment for a real-world vehicle (e.g., vehicles 700 and/or 760).

In the embodiment of FIG. 6A, occupancy grid generator 600 is implemented on graphics platform 101, as described herein for FIG. 1. Accordingly, the disclosure herein for graphics platform 101, including processor(s) 150, memory 152, GPU(s) 154, communication component 156, I/O 158, network(s) 166, and/or I/O device(s) 168 applies in the same or similar manner for the disclosures of FIG. 6A. Occupancy grids may be used to train machine learning models and/or self-driving control architectures for the control of autonomous vehicles. For example, occupancy grids may be used as input to a machine learning model (e.g., as training data) to determine decisions or predictions an autonomous vehicle makes during operation to turn, steer, avoid objects (e.g., a machine learning model of motion planner 540, and/or a machine learning model of prediction component 520, in FIG. 5). Such decisions or predictions may be implemented as fully, or at least partially, trained machine learning model/self-driving control architectures, where occupancy grids generated by the systems of an autonomous vehicle (whether real or virtual), are similar to those used to train the fully, or at least partially, trained machine learning model/self-driving control architecture, and are used as input to such trained machine learning model/self-driving control architecture to operate the autonomous vehicle in a real or virtual environment.

Figure 6B:
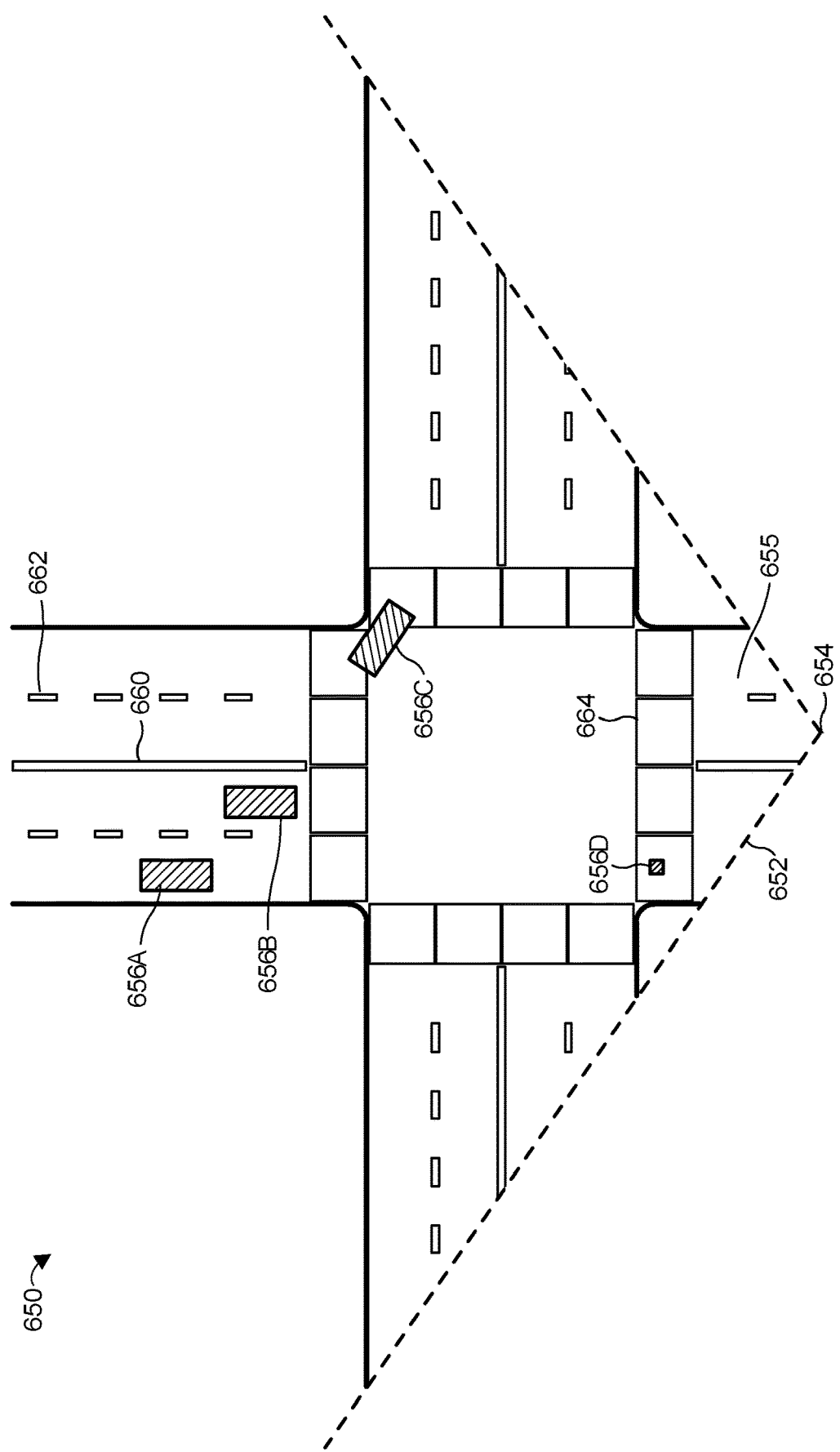
FIG. 6B illustrates an example occupancy grid that may be generated by the occupancy grid generator of FIG. 6A and/or the perception component of FIG. 5.

Occupancy grid generator 600 may include a normal layer component 602 configured to generate a normal layer 612 of an occupancy grid 610 based on the imaging scene (e.g., scene 400 or 450 of FIGS. 4A and 4B, respectively). Normal layer 612 may define a two-dimensional (2D) view of a related imaging scene (e.g., photo-realistic scene 200 of FIG. 2A). With respect to occupancy grid generator 600, normal layer component 602 may be part of, or may utilized, an imaging or gaming engine (e.g., such as described for imaging engine 102) to generate normal layer 612. In various embodiments, normal layer 612 may be an RGB layer or scene (e.g., scene 400 or 450) as rendered and displayed by an imaging or gaming engine. Normal layer 612 is generally a top-down graphical view of the virtual environment, e.g., where a game engine camera is positioned overhead and looking down upon a scene (e.g., as depicted in FIG. 6B). For example, as further described herein, FIG. 6B depicts an occupancy grid 650 with an overhead view including road 655, vehicles 656A-C, pedestrian 656D, etc.

Occupancy grid generator 600 may further include a label layer component 604 configured to generate a label layer 614. In various aspects, label layer 614 may be mapped to normal layer 612 (e.g., as depicted by occupancy grid 610), and encoded with a first channel set. While occupancy grid 610 is represented as a series of layered objects, it is to be understood that occupancy grid 610 need not be visualized and may exist as a computing structure or object, e.g., in memory 152 of graphics platform 101. The first channel set may be associated with one or more text-based or state-based values of one or more objects of the environment (e.g., objects or surfaces 402-418 of the virtual environment of FIG. 4A or objects or surfaces depicted in FIG. 6B, including, for example, road 655, vehicles 656A-C, pedestrian 656D, etc.). In some embodiments, the first channel set may include a plurality of first channels of a pixel. For example, the plurality of first channels of the pixel may include red (R), green (G), and blue (B) channels. Each of the plurality of first channels of the pixel may indicate a particular text-based or state-based value. The text-based or state-based values may define one or more classifications or one or more states of the one or more objects of the environment. For example, a value of zero (e.g., where all RGB channels have a zero value) may indicate that a vehicle (e.g., vehicle 401 of FIG. 4A or vehicle 656C of FIG. 6B) in the scene is not moving. As another example, a value of 65 may indicate (e.g., where RGB channels equal a value of 65), or label, that a particular object or surface with a scene is a miscellaneous object or surface (e.g., non-moving miscellaneous object 482 of FIG. 4B).

Occupancy grid generator 600 may further include a velocity layer component 606 configured to generate a velocity layer 616. In various aspects, velocity layer 616 may be mapped to normal layer 612 (e.g., as depicted by occupancy grid 610), and encoded with a second channel set. In various aspects, the second channel set may be associated with one or more velocity values of one or more objects of the environment (e.g., vehicles 401, 412, 414 of the virtual environment of FIG. 4A and/or vehicles 656A-C of FIG. 6B). In some embodiments, the second channel set includes a plurality of second channels of a pixel. For example, the plurality of the second channels of the pixel includes a red (R) channel, a green (G) channel, and a blue (B) channel. In various embodiments, each of the plurality of second channels of the pixel indicates a particular velocity value. The velocity value may define a direction and speed of an object within a virtual environment (e.g., vehicles 401, 412, 414 of the virtual environment of FIG. 4A and/or vehicles 656A-C of FIG. 6B). In some embodiments, the direction and/or speed may be separated across various components and defined by the plurality of second channels. In particular, the R channel may define a first component for the velocity layer, the G channel may define a second component for the velocity layer, and the B channel may define a third component for the velocity layer. For example, each of the first component, second component, and third component may define a direction and/or speed of an object within an environment (e.g., vehicles 401 and/or 451 of the virtual environment of FIG. 4A and/or vehicles 656A-C of FIG. 6B). For example, where all components equal zero, thereby defining an overall RGB value of zero, a related object may be a rest/not moving within a virtual environment. As another example, an overall RGB value of 60 may define a velocity of 60 miles-per-hour a particular direction. In this way, the channel sets (e.g., first or second channel sets) may be defined by 256 bit RGB values that act as a hash values for respective velocity values or types of objects or surfaces. For example, the one or more velocity values define corresponding one or more velocities of one or more vehicles (e.g., vehicles 401, 412, 414, and/or 656A-C) moving within the environment (e.g., virtual environment of FIGS. 4A and/or 6B).

In various embodiments, occupancy grid generator 600 may generate an occupancy grid 610 based on normal layer 612, label layer 614, and velocity layer 616. Occupancy grid 610 may be used to control a vehicle (e.g., a vehicle 401, 412, 414, and/or 656A-C) as the vehicle moves through the environment (e.g., virtual environment of FIG. 4A and/or FIG. 6B).

In additional embodiments, occupancy grid generator 600 may further include a height layer component (not shown) configured to generate a height layer (not shown). In such embodiments, the height layer may be mapped to normal layer 612 of occupancy grid 610. The height layer may be encoded with a third channel set associated with one or more height values. The third channel set may include a plurality of third channels of a pixel. For example, the plurality of third channels of the pixel may include red (R), green (G), and blue (B) channels. Each of the plurality of third channels of the pixel indicates a particular height value. For example, channel R may relate to ground values, channel B may relate to sky values, and channel G may relate to mid-range (e.g., between ground and sky) values. As for the first and second channel sets, the third channel set may be defined by 256 bit RGB values that act as a hash values for respective height values of objects or surfaces. For example, height channels may indicate a height of a building (e.g., building 418 of FIG. 4A).

FIG. 6B illustrates an example occupancy grid 650 that may be generated by the occupancy grid generator 600 of FIG. 6A and/or the perception component 506 of FIG. 5. For example, occupancy grid 650 may be occupancy grid 610 as generated by occupancy grid generator 600 as described for FIG. 6A described herein. In addition, or in the alternative, the perception component 506 may generate the occupancy grid 650 which represents a further embodiment and scenario of an occupancy grid. Generally, an occupancy grid (e.g., 610 or 650) may be an output (e.g., an output of perception component 506 or occupancy grid generator 600) used to control, or partially control, an autonomous vehicle (e.g., 401, 451, 700, and/or 760) for some unit of time (e.g., one microsecond). As described herein, the occupancy grid may comprise a top-down view of a virtual environment. In an occupancy grid, each image may comprise one or more pixels (e.g., RGB pixels), or pixel versions, having a class type. Predictions may be made based on classes of pixel version or type. Use of an occupancy grid for predictive purposes in controlling an autonomous vehicle generally results in very efficient control via simplifying, by converting, a real-world (e.g., 3D) scene (e.g., such as scene 400 or 450) into a simple top-down view of the scene, e.g., as exemplified by FIG. 6B.

While depicted as a visual image in FIG. 6B, it is understood that, in some embodiments, the occupancy grid 650 is not actually rendered or displayed at any time. The occupancy grid 650 of FIG. 6B corresponds to an embodiment in which the physical area represented by the occupancy grid 650 (i.e., the area within a particular azimuthal angle and partially bounded by the dashed lines 652) is coextensive with at least the horizontal field of regard of one or more sensors of the autonomous vehicle, with the sensor(s) and autonomous vehicle currently being positioned at location 654. In other embodiments, however, the area represented by the occupancy grid 650 is smaller than, or otherwise not coextensive with, the field of regard. Moreover, in some embodiments, the perimeter of the occupancy grid 650 may be a rectangle, circle, or other shape that encompasses the current location 654 of the autonomous vehicle (e.g., with the location 654 being at the center of the rectangle or circle).

In the example scenario of FIG. 6B, the occupancy grid 650 includes (i.e., includes representations of) a number of objects or surfaces, and areas associated with objects or surfaces, including: a road 655, dynamic objects 656A-D (i.e., vehicles 656A-C and a pedestrian 656D), lane markings 660, 662, and traffic light areas 664. The example occupancy grid 650 may include data representing each of the object/area positions, as well as data representing the object/area types (e.g., including classification data that is generated by, or is derived from data generated by, the classification module 512).

Object classes/types may be indicated at a relatively high level of generality (e.g., with each of objects 656A-C having the class "vehicle," each of objects 660, 662 having the class "lane marker," etc.), or with more specificity (e.g., with object 556A having the class "sport utility vehicle" and object 656B having the class "sedan," and/or with objects 660 having the class "lane marker: solid" and objects 662 having the class "lane marker: dashed," etc.). Globally or locally unique identifiers (e.g., labels or descriptors) may also be specified by the occupancy grid 650 (e.g., "VEH001" through "VEH003" for vehicles 656A through 656C, respectively, and "PED001" for pedestrian 656D, etc.). Depending on the embodiment, the occupancy grid 650 may also be associated with state data, such as a current direction and/or speed of some or all depicted objects. In other embodiments, however, the state of each object or area is not embedded in the occupancy grid 650, and the occupancy grid 650 only includes data representing a stateless snapshot in time. For example, the prediction component 520 may infer the speed, direction, and/or other state parameters of dynamic objects using the unique identifiers of specific objects, and the change in the positions of those objects within a succession of occupancy grids over time.

In some embodiments, the occupancy grid 650 only associates certain types of objects and/or types of areas with current states. For each of the 16 different traffic light areas 664 (e.g., each corresponding to an area in which vehicles are expected to stop when the light is red), for example, the traffic occupancy grid 650 may include not only data specifying the location of the traffic light position 664, but also data indicating whether the traffic light associated with that area 664 is currently red, yellow, or green (or possibly whether the traffic light is blinking, an arrow versus a circle, etc.).

Virtual and Real-World Autonomous Vehicles

Figure 7A:
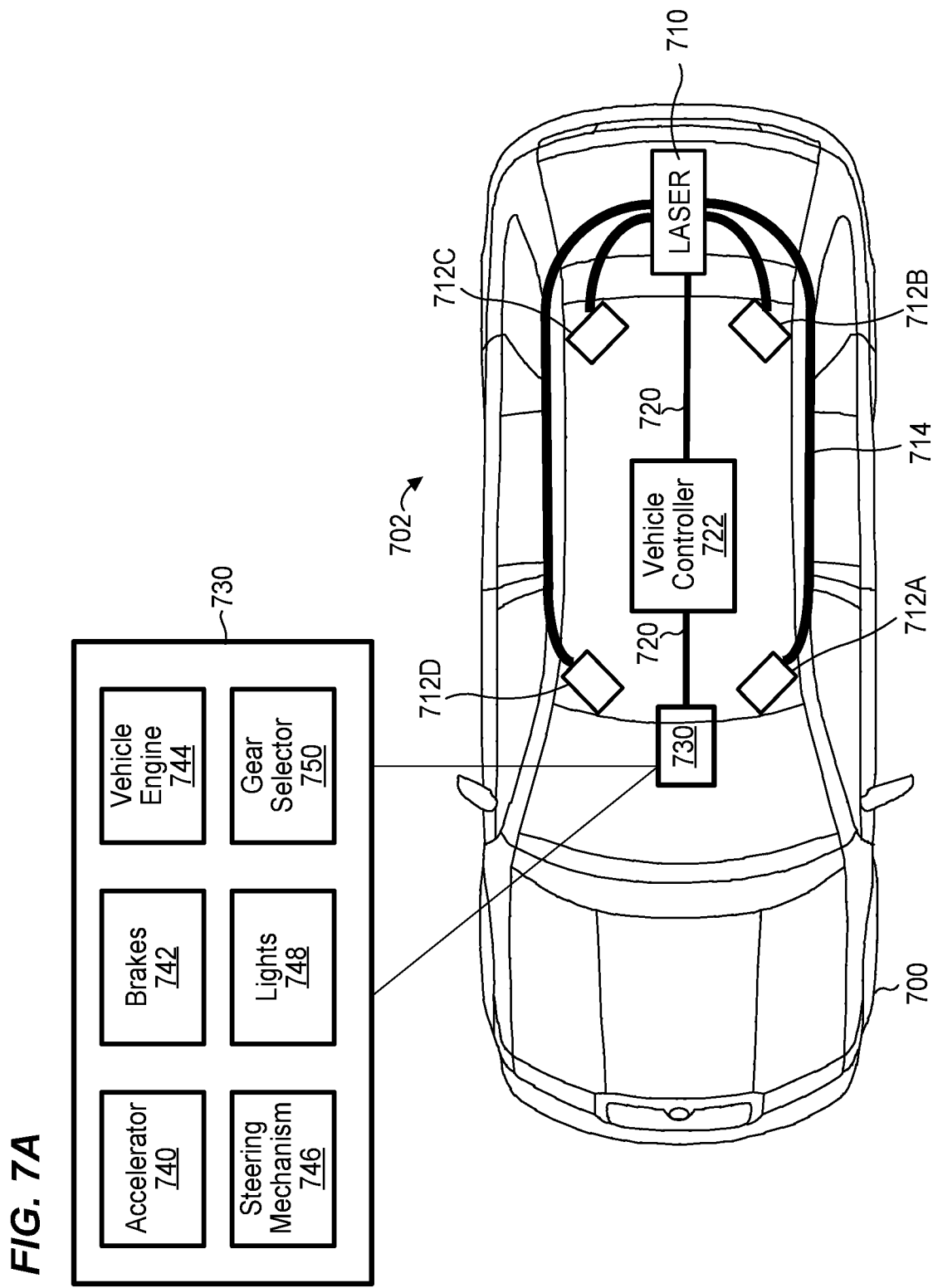
FIG. 7A illustrates an example virtual or real-world autonomous vehicle configured to implement the self-driving control architecture of FIG. 5 in accordance with various embodiments disclosed herein.

FIG. 7A illustrates an example virtual or real-world autonomous vehicle 700 configured to implement the self-driving control architecture of FIG. 5 in accordance with various embodiments disclosed herein. It is to be understood that vehicle 700 (and vehicle 760 of FIG. 7B) may represent either a virtual vehicle in a virtual environment (e.g., vehicles 401 and/or 451) having virtual or simulated sensors, as described herein, or real-world vehicle in a real-world environment as described in in U.S. Provisional Patent Application Ser. No. 62/573,795 entitled "Software Systems and Methods for controlling an Autonomous Vehicle," which was filed on Oct. 28, 2017, the entire disclosure of which is hereby incorporated by reference. In various embodiments, the machine learning models, self-driving control architectures (SDCAs), implementation(s), setup(s), or otherwise design(s) of an autonomous virtual vehicle of a virtual environment as described herein and an autonomous real-world vehicle of a real-world environment are implemented in the same or similar fashion such that the data or information generated in one environment may be used in the other environment. For example, as described herein, data or information generated via the virtual environment, e.g., via feature training dataset(s) may be used for real-world environments (e.g., by training machine learning models to operate in the real-world, as described herein). As another example, real-world data captured via real-world cameras or other sensors may be combined with virtual data captured in a virtual environment (e.g., via feature training dataset(s)) may be used for real-world environments (e.g., by training machine learning models to operate in the real-world, as described herein).

Vehicle 700 includes lidar system 702. The lidar system 702 includes a laser 710 with multiple sensor heads 712A-D coupled to the laser 710 via multiple laser-sensor links 714. Each of the sensor heads 712 may include some or all of the components of the lidar system 300 as illustrated and described in U.S. Provisional Patent Application Ser. No. 62/573,795 entitled "Software Systems and Methods for controlling an Autonomous Vehicle," which was filed on Oct. 28, 2017, the entire disclosure of which is hereby incorporated by reference.

Each of the laser-sensor links 714 may include one or more optical links and/or one or more electrical links. The sensor heads 712 in FIG. 7A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 712 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 7A, four sensor heads 712 are positioned at or near the four corners of the vehicle (e.g., each of the sensor heads 712 may be incorporated into a light assembly, side panel, bumper, or fender), and the laser 410 may be located within the vehicle 700 (e.g., in or near the trunk). The four sensor heads 712 may each provide a 90° to 120° horizontal field of regard (FOR), and the four sensor heads 712 may be oriented so that together they provide a complete 360-degree view around the vehicle. As another example, the lidar system 702 may include six sensor heads 712 positioned on or around the vehicle 700, where each of the sensor heads 712 provides a 60° to 90° horizontal FOR. As another example, the lidar system 702 may include eight sensor heads 712, and each of the sensor heads 712 may provide a 45° to 60° horizontal FOR. As yet another example, the lidar system 702 may include six sensor heads 712, where each of the sensor heads 712 provides a 70° horizontal FOR with an overlap between adjacent FORs of approximately 10°. As another example, the lidar system 702 may include two sensor heads 412 which together provide a forward-facing horizontal FOR of greater than or equal to 30°.

Data from each of the sensor heads 712 may be combined, processed, or otherwise stitched together to generate a point cloud or other image (e.g., 2D, 3D, and/or RGB image as described herein) that covers a greater than or equal to 30-degree horizontal view around a vehicle. For example, the laser 710 may include a controller or processor that receives data from each of the sensor heads 712 (e.g., via a corresponding electrical link 720) and processes the received data to construct a point cloud or other image (e.g., 2D, 3D, and/or RGB image as described herein) covering a 360-degree horizontal view around a vehicle or to determine distances to one or more targets. The point cloud, information from the point cloud, or other image may be provided to a vehicle controller 722 via a corresponding electrical, optical, or radio link 720. The vehicle controller 722 may include one or more CPUs, GPUs, and a non-transitory memory with persistent components (e.g., flash memory, an optical disk) and/or non-persistent components (e.g., RAM).

In some implementations, the point cloud or other image (e.g., 2D, 3D, and/or RGB image as described herein) is generated by combining data from each of the multiple sensor heads 712 at a controller included within the laser 710, and is provided to the vehicle controller 422. In other implementations, each of the sensor heads 712 includes a controller or processor that constructs a point cloud or other image (e.g., 2D, 3D, and/or RGB image) for a portion of the 360-degree horizontal view around the vehicle and provides the respective point cloud to the vehicle controller 722. The vehicle controller 722 then combines or stitches together the points clouds from the respective sensor heads 712 to construct a combined point cloud or other image (e.g., 2D, 3D, and/or RGB image) covering a 360-degree horizontal view. Still further, the vehicle controller 722 in some implementations communicates with a remote server to process point cloud or other image (e.g., 2D, 3D, and/or RGB image) data.

In any event, the vehicle 700 may be an autonomous vehicle where the vehicle controller 722 provides control signals to various components 730 within the vehicle 700 to maneuver and otherwise control operation of the vehicle 700. It is to be understood that, for embodiments where vehicle 700 is a virtual vehicle, some or all of components 730 may be omitted, or approximated via a simplified model, where such simplified model accounts for only those portions used for testing or generating training data as described herein.

The components 730 are depicted in an expanded view in FIG. 7A for ease of illustration only. The components 730 may include an accelerator 740, brakes 742, a vehicle engine 744, a steering mechanism 746, lights 748 such as brake lights, headlights, reverse lights, emergency lights, etc., a gear selector 750, and/or other suitable components that effectuate and control movement of the vehicle 700. The gear selector 750 may include the park, reverse, neutral, drive gears, etc. Each of the components 730 may include an interface via which the component receives commands from the vehicle controller 722 such as "increase speed,"

"decrease speed," "turn left five degrees," "activate left turn signal," etc., and, in some cases, provides feedback to the vehicle controller 722.

In some implementations, the vehicle controller 722 may receive point cloud or other image (e.g., 2D, 3D, and/or RGB image) data from the sensor heads 712 via the link 720 and analyzes the received point cloud data or other image (e.g., 2D, 3D, and/or RGB image), using any one or more of aggregate or individual SDCAs as disclosed herein or in U.S. Provisional Patent Application Ser. No. 62/573,795 entitled "Software Systems and Methods for controlling an Autonomous Vehicle," which was filed on Oct. 28, 2017, the entire disclosure of which is hereby incorporated by reference, to sense or identify targets, objects, or surfaces (see, e.g., FIGS. 2A, 2B, 3, 4A, and/or 4B) and their respective locations, distances, speeds, shapes, sizes, type of target (e.g., vehicle, human, tree, animal), etc. The vehicle controller 722 then provides control signals via the link 720 to the components 730 to control operation of the vehicle based on the analyzed information. One, some or all of the components 730 may be the operational subsystems, or may be included within the operational subsystems, that receive the control signals 110 of any one of the SDCAs, or receive the decisions 542 of FIG. 5, for example.

In addition to the lidar system 702, the vehicle 700 may also be equipped with other sensors such a camera, a thermal imager, a conventional radar (none illustrated to avoid clutter), etc. The sensors can provide additional data to the vehicle controller 722 via wired or wireless communication links. Further, the vehicle 700 in an example implementation includes a microphone array operating as a part of an acoustic source localization system configured to determine sources of sounds.

Figure 7B:
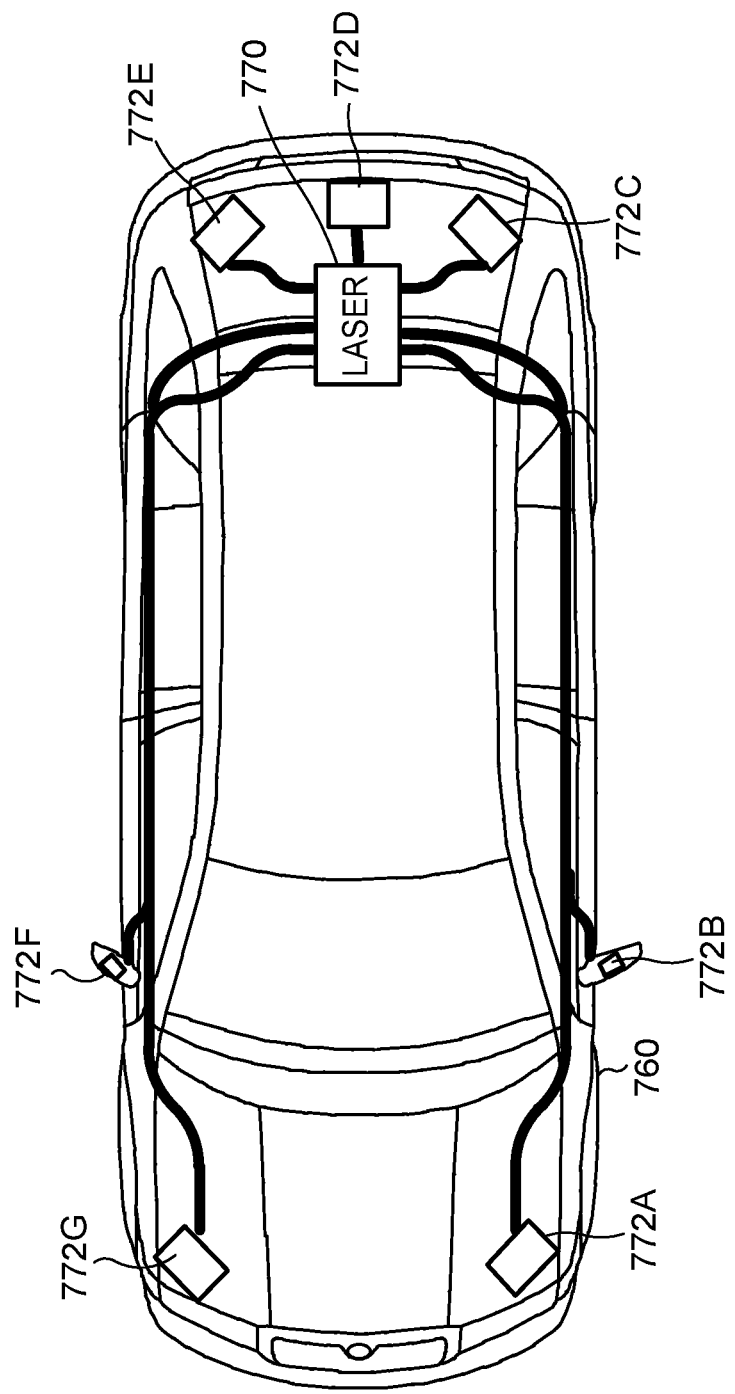
FIG. 7B illustrates another example vehicle in which the self-driving control architecture of FIG. 5 may operate.

FIG. 7B illustrates another example vehicle in which the self-driving control architecture of FIG. 5 may operate. FIG. 7B illustrates a vehicle 760 (real or virtual with real or simulated sensors, respectively) in which a laser 770 is optically coupled to six sensor heads 772, each of which may be similar to one of the sensor heads 412 of FIG. 7A. The sensor heads 772A and 772G are disposed at the front of the hood, the sensor heads 772B and 772F are disposed in the side view mirrors, and the sensor heads 772C-E are disposed on the trunk. In particular, the sensor head 772D is oriented to face backward relative to the orientation of the vehicle 760, and the sensor heads 772C-E are oriented at approximately 45-degrees relative to the axis of orientation of the sensor head 772D.

Example Self-Driving Control Architecture(s)

Figure 8:
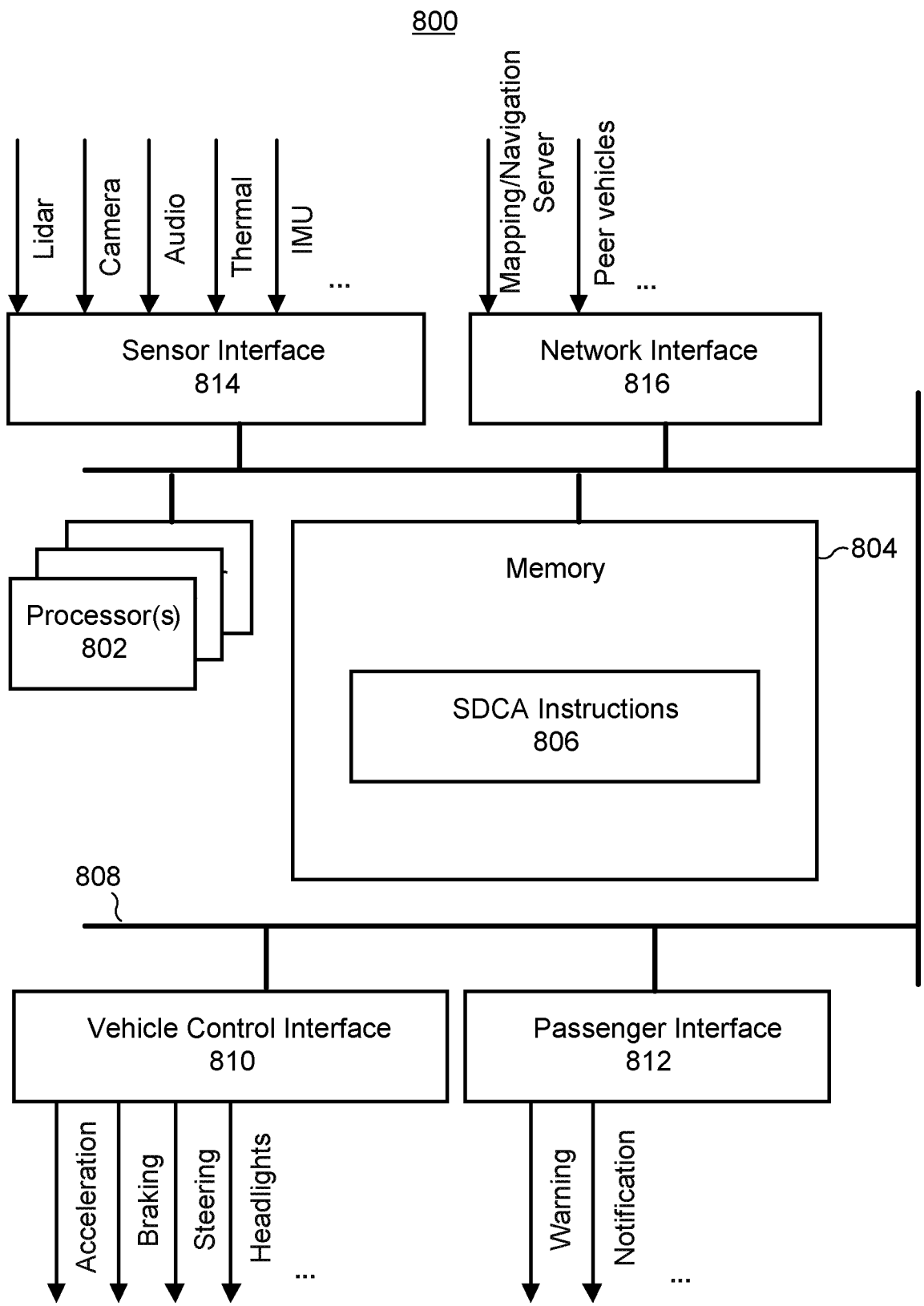
FIG. 8 is a block diagram of an example computing system for controlling virtual and/or real-world autonomous vehicles, which may be used to implement the self-driving control architecture of FIG. 5.

FIG. 8 is a block diagram of an example computing system 800 for controlling virtual and/or real-world autonomous vehicles, which may be used to implement the self-driving control architecture of FIG. 5. In a real-world vehicle, the computing system 800 may be integrated within an autonomous vehicle in any suitable manner, and at any suitable location or locations within the vehicle. For a virtual vehicle, the computing system 800 may be emulated and/or implemented on a computing system (e.g., graphics platform 101) that simulates for a virtual vehicle how a given vehicle system would be configured and/or integrated for operation in a real-world environment. For example, any of processor(s) 802, memory 804, etc. could be emulated via processor(s) 150, memory 152, etc. of the automated training dataset generator 100. In this way, the data generated and used in the real-world would experience equal or similar execution sequences, errors, or otherwise in the virtual world so as to allow for more accurate testing, timing, or other synergies between data trained, used, etc. across real-world and virtual environments and uses. Accordingly, for FIG. 8, disclosures of use, integration, or implementation of computing system 800 by real-world vehicles (e.g., represented in some embodiments by vehicles 700 and 760 of FIGS. 7A and 7B, respectively) applies equally for virtual vehicles (e.g., represented by vehicles 401 and/or 451 of FIGS. 4A and 4B, respectively).

Computing system 800 may be included, or partially included, within the vehicle controller 722 of FIG. 7A, for example. The computing system 800 includes one or more processor(s) 802, and a memory 804 storing SDCA instructions 806. Depending on the embodiment, the SDCA instructions 806 may correspond to the SDCA of FIG. 5 or other machine learning model generated as described herein, for example.

In embodiments where the processor(s) 802 include more than a single processor, each processor may be a different programmable microprocessor that executes software instructions stored in the memory 804. Alternatively, each of the processor(s) 802 may be a different set of such microprocessors, or a set that includes one or more microprocessors and one or more other processor types (e.g., ASICs, FPGAs, etc.) for certain functions.

The memory 804 may include one or more physical memory devices with non-volatile memory. Any suitable memory type or types may be used, such as ROM, solid-state drives (SSDs), hard disk drives (HDDs), and so on. The processor(s) 802 are coupled to the memory 804 via a bus or other network 808. The network 808 may be a single wired network, or may include any suitable number of wired and/or wireless networks. For example, the network 808 may be or include a controller area network (CAN) bus, a Local Interconnect Network (LNN) bus, and so on.

In some embodiments where the SDCA instructions 806 correspond an SDCA or machine learning model as described herein, where processor(s) 802 execute a corresponding SDCA or machine learning model for control and/or operation of a virtual or real-world autonomous vehicle.

Also coupled to the network 808 are a vehicle control interface 810, a passenger interface 812, a sensor interface 814, and a network interface 816. Each of the interfaces 810, 812, 814, and 816 may include one or more processors (e.g., ASICs, FPGAs, microprocessors, etc.) and/or other hardware, firmware and/or software to enable communication with systems, subsystems, devices, etc., whether real or simulated, that are external to the computing system 800.

The vehicle control interface 810 is generally configured to provide control data generated by the processor(s) 802 to the appropriate operational subsystems of the autonomous vehicle, such that the appropriate subsystems can effectuate driving decisions made by the processor(s) 802. For example, the vehicle control interface 810 may provide the control signals to the appropriate subsystem(s) (e.g., accelerator 740, brakes 742, and steering mechanism 746 of FIG. 7A). As another example, referring to FIG. 5, the vehicle control interface 810 may provide the motion planner output (or maneuver executor output) to the appropriate subsystem(s). In some embodiments, the vehicle control interface 810 includes separate interface hardware, firmware, and/or software for different operational subsystems.

The passenger interface 812 is generally configured to provide alerts, warnings, notifications, and/or other information to one or more passengers of the autonomous vehicle. In some embodiments where the vehicle is not fully autonomous (e.g., allowing human driving in certain modes and/or situations), the passenger interface 812 may specifically provide such information to the driver (e.g., via dashboard indicators, etc.). As just one example, the passenger interface 812, whether real or virtual, may cause a display and/or speaker in the vehicle to generate an alert when the processor(s) 802 (executing the SDCA instructions 806) determine that a collision with another object is likely. As another example, the passenger interface 812 may cause a display in the vehicle to show an estimated time of arrival (ETA) to passengers. In some embodiments, the passenger interface 812 also permits certain user inputs. If the vehicle supports passenger selection of specific driving styles (e.g., as discussed above in connection with FIG. 3), for example, the passenger interface 812 may cause a display to present a virtual control (e.g., button) that a passenger may activate (e.g., touch, scroll through, etc.) to select a particular driving style.

The sensor interface 814 is generally configured to convert raw sensor data, whether real or virtual, from one or more real or simulated sensor devices (e.g., lidar, camera, microphones, thermal imaging units, IMUs, etc.) to a format that is consistent with a protocol of the network 808 and is recognized by one or more of the processor(s) 802. The sensor interface 814 may be coupled to a lidar system, whether real or virtual (e.g., the lidar system 702 of FIG. 7A), for example, with the sensor interface 814 converting point cloud data to an appropriate format. In some embodiments, the sensor interface 814 includes separate interface hardware, firmware, and/or software for each sensor device and/or each sensor type.

The network interface 816, whether real or virtual, is generally configured to convert data received from one or more devices or systems external to the autonomous vehicle to a format that is consistent with a protocol of the network 808 and is recognized by one or more of the processor(s) 802. In some embodiments, the network interface 816 includes separate interface hardware, firmware, and/or software for different external sources. For example, a remote mapping/navigation server may send mapping and navigation/route data (e.g., mapping and navigation signals 532 of FIG. 5) to the computing system 800 via a cellular network interface of the network interface 816, while one or more peer vehicles (e.g., other autonomous vehicles) may send data (e.g., current positions of the other vehicles) to the computing system 800 via a WiFi network interface of the network interface 816. Other types of external data may also, or instead, be received via the network interface 816. For example, the computing system 800 may use the network interface 816 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 814, whether real or virtual. Instead, the processor(s) 802 execute the SDCA instructions 806 using, as input, only (or primarily) data that is received by the network interface 816 from other vehicles, infrastructure, and/or other external devices/systems. In such an embodiment, the external data may include raw sensor data that is indicative of the vehicle environment (but was generated off-vehicle), and/or may include higher-level information that was generated externally using raw sensor data (e.g., occupancy grids, as discussed herein for FIGS. 6A and 6B).

The network 808, whether real or virtual, may also couple to other types of interfaces and/or components, and/or some of the interfaces shown in FIG. 8 may be omitted (e.g., the sensor interface 814, as discussed above). Moreover, it is understood that the computing system 800 represents just one possible configuration for supporting the software architectures, functions, features, etc., described herein, and that others are also within the scope of this disclosure.

Example Flow Diagrams

Figure 9:
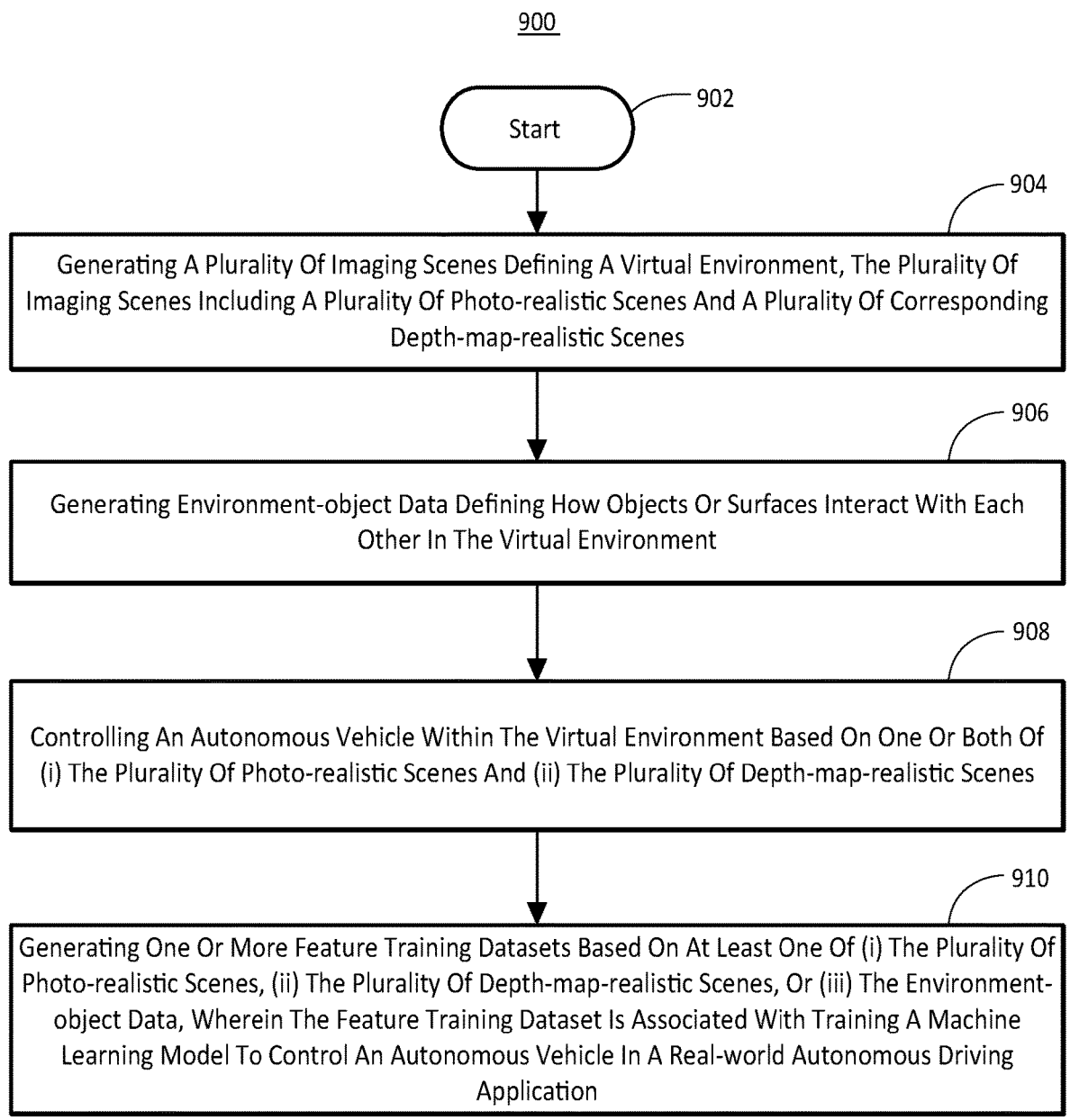
FIG. 9 is a flow diagram of an example automated training dataset generation method for generating feature training datasets for use in real-world autonomous driving applications based on virtual environments.

FIG. 9 is a flow diagram of an example automated training dataset generation method 900 for generating feature training datasets for use in real-world autonomous driving applications based on virtual environments. Method 900 may be implemented, for example, by processor(s) 150 and/or GPU(s) 154, etc. of automated training dataset generator 100, where training dataset(s) may be generated as described herein. Method 900 begins (902) at block 904 where, e.g., automated training dataset generator 100, generates a plurality of imaging scenes (e.g., scenes 390, 400 and/or 450) defining a virtual environment (e.g., the virtual environments of FIGS. 3, 4A, and 4B, respectively). The plurality of imaging scenes may include a plurality of photo-realistic scenes (e.g., as exemplified by scenes 400 and 450) and a plurality of corresponding depth-map-realistic scenes (e.g., as exemplified by scene 390).

At block 906, method 900 may further include generating (e.g., via automated training dataset generator 100) environment-object data defining how objects or surfaces (e.g., objects and surfaces 391-398 of FIG. 3, objects and surfaces 401-418 of FIG. 4A, and/or objects and surfaces 451-482) interact with each other in the virtual environment.

At block 908, method 900 may further include controlling an autonomous vehicle within the virtual environment based on one or both of (i) the plurality of photo-realistic scenes (e.g., scenes 400 and 450) and (ii) the plurality of depth-map-realistic scenes (e.g., scene 390).

At block 910, method 900 may further include generating one or more feature training datasets based on at least one of (i) the plurality of photo-realistic scenes (e.g., scenes 400 and 450), (ii) the plurality of depth-map-realistic scenes (e.g., scene 390), or (iii) the environment-object data (e.g., data associated with objects and surfaces 391-398 of FIG. 3, objects and surfaces 401-418 of FIG. 4A, and/or objects and surfaces 451-482). As described herein, feature training dataset may be associated with training a machine learning model to control an autonomous vehicle (e.g., vehicle 700 or 760) in a real-world autonomous driving application.

Figure 10:
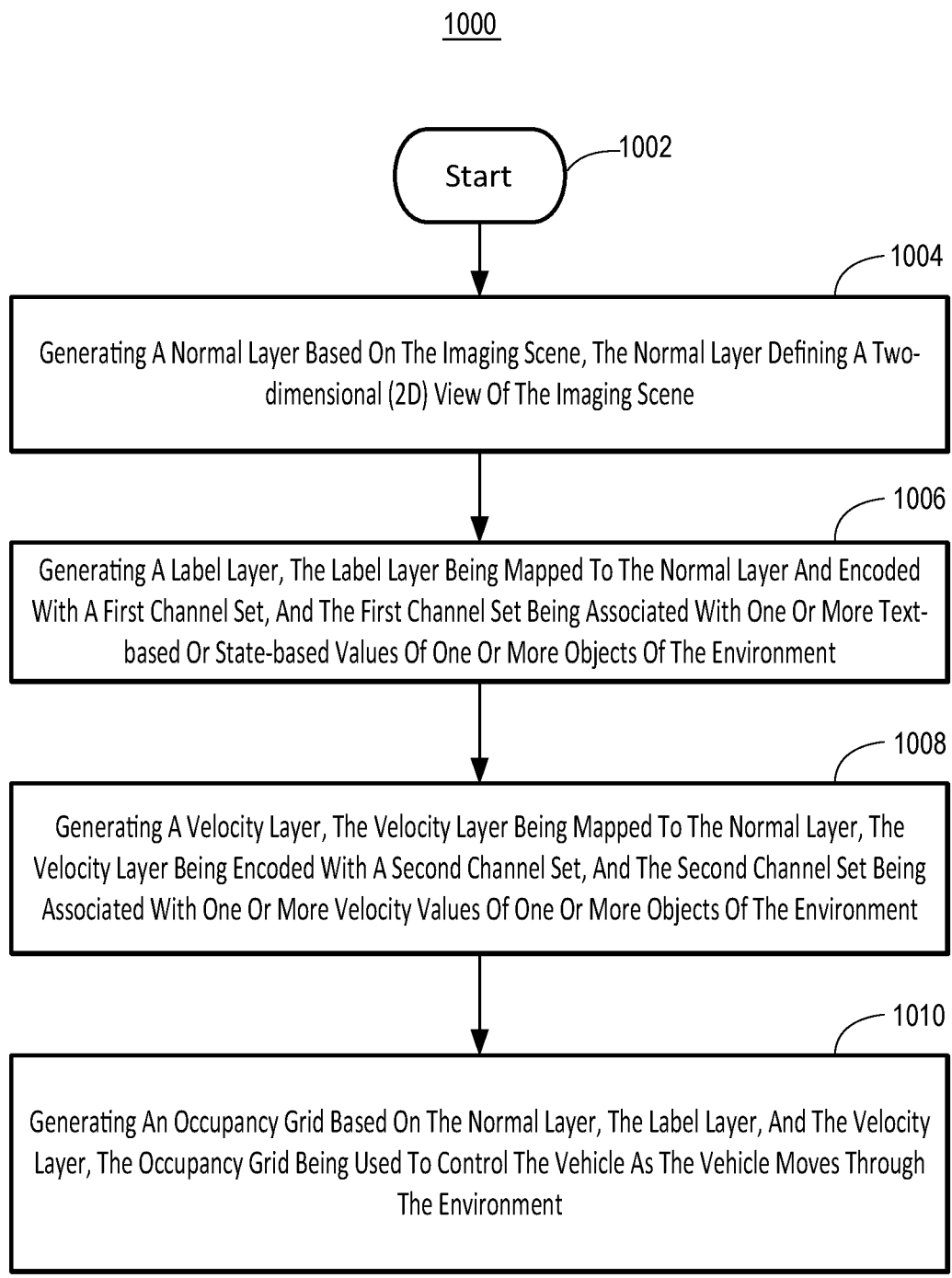
FIG. 10 is a flow diagram of an example occupancy grid generation method for generating an occupancy grid indicative of an environment of a vehicle from an imaging scene that depicts the environment.

FIG. 10 is a flow diagram of an example occupancy grid generation method 1000 for generating an occupancy grid indicative of an environment of a vehicle from an imaging scene (e.g., as exemplified by scenes 400 and 450) that depicts the environment (e.g., virtual environments of FIGS. 4A and 4B). Method 1000 may be implemented, for example, by processor(s) 150 and/or GPU(s) 154, etc. of automated training set generator 100, where occupancy grids may be generated as described herein (e.g., as described for FIGS. 6A and 6B).

Method 1000 may begin (1002) at block 1004 where, e.g., occupancy grid generator 600, generates a normal layer (e.g., normal layer 612) based on the imaging scene (e.g., as exemplified by scenes 400 and 450). As described elsewhere herein, the normal layer may define a two-dimensional (2D) view of the imaging scene.

At block 1006, method 1000 may further include generating a label layer (e.g., label layer 614). The label layer may be mapped to the normal layer and encoded with a first channel set (e.g., plurality of first channels of a pixel that may include RGB channels). The first channel set may be associated with one or more text-based or state-based values of one or more objects of the environment (e.g., one or more classifications or one or more states of the one or more objects of the environment).

At block 1008, method 1000 may include generating, e.g., via occupancy grid generator 600, a velocity layer (e.g., velocity layer 616). The velocity layer (e.g., velocity layer 616) may be mapped to the normal layer (e.g., normal layer 612) and encoded with a second channel set (e.g., a plurality of second channels of a pixel, which may include RGB values). The second channel set may be associated with one or more velocity values of one or more objects of the environment.

At block 1010, method 1000 may include generating, e.g., via occupancy grid generator 600, an occupancy grid (e.g., occupancy grid 610 or 650) based on the normal layer, the label layer, and the velocity layer. The occupancy grid may be used to control the vehicle (e.g., vehicle 401, 451, 700, and/or 760) as the vehicle moves through an environment (e.g., any of the environments depicted in FIGS. 2A-4B).

Figure 11:
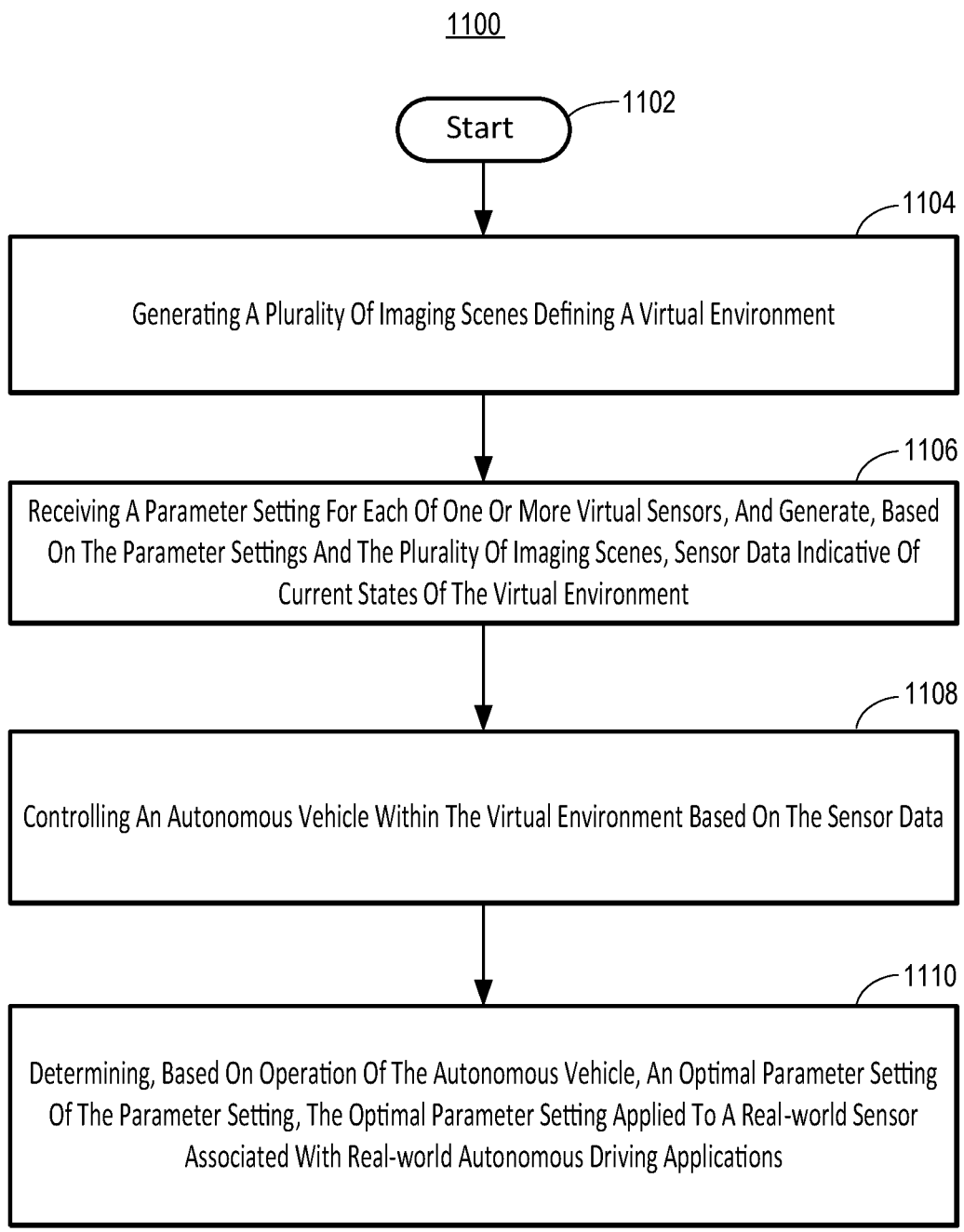
FIG. 11 is a flow diagram of an example sensor parameter optimizer method for determining parameter settings for use by real-world sensors in autonomous driving applications.

FIG. 11 is a flow diagram of an example sensor parameter optimizer method 1100 for determining parameter settings for use by real-world sensors in autonomous driving applications. Method 1100 may be implemented, for example, by processor(s) 150 and/or GPU(s) 154, etc. of automated training dataset generator 100, and specifically via sensor parameter optimizer 112, where optimal parameter settings may be determined, generated, and/or applied to a real-world sensor or virtual sensors associated with real-world or virtual autonomous driving applications as described herein. Method 1100 begins (1102) via generating, at block 1104, e.g., via sensor parameter optimizer 112, a plurality of imaging scenes (e.g., any one or more of scenes 390, 400, 450) defining a virtual environment (e.g., virtual environments of FIGS. 3, 4A, and/or 4B).

At block 1106, method 1100 may further include receiving, e.g., at automated training dataset generator 100, or specifically at sensor parameter optimizer 112, a parameter setting for each of one or more virtual sensors. The virtual sensors may be associated with a virtual vehicle, e.g., vehicles 700 and/or 760 as described herein for FIGS. 7A and 7B. Method 1100 may further include generating, based on the parameter settings and the plurality of imaging scenes (e.g., any one or more of scenes 390, 400, 450), sensor data indicative of current states of the virtual environment.

At block 1108, method 1100 may further include controlling an autonomous vehicle within the virtual environment based on the sensor data.

At block 1110, method 1100 may further include determining, based on operation of the autonomous vehicle within the virtual environment, an optimal parameter setting of the parameter setting. The optimal parameter may be determined while the autonomous vehicle is operating within the virtual environment, or the optimal parameter may be determined at a later time after data for the autonomous vehicle operating within the virtual environment has been collected. As the term is used herein "optimal parameter" may refer to a value, control signal, setting, or other parameter within a range or ranges of such values, control signals, settings, or other parameters within which an autonomous vehicle operates in a controlled, safe, efficient, and/or otherwise desired manner. That is, in various embodiments there may more than one such "optimal" value, control signal, setting, or other parameter, that an autonomous vehicle may operate by in order to achieve such controlled, safe, efficient, and/or otherwise desired operation(s). Instead, a range of such values may apply. The optimal parameter setting(s), so determined, may be applied to a real-world sensor associated with real-world autonomous driving applications.

GENERAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A non-transitory computer-readable medium storing thereon instructions executable by one or more processors to implement an automated training dataset generator that generates feature training datasets for use in real-world autonomous driving applications based on virtual environments, the automated training dataset generator comprising:
   an imaging engine configured to generate a plurality of imaging scenes defining a virtual environment, the plurality of imaging scenes including a plurality of photo-realistic scenes and a plurality of corresponding depth-map-realistic scenes;
   a physics component configured to generate environment-object data defining how objects or surfaces interact with each other in the virtual environment;
   an autonomous vehicle simulator configured to control an autonomous vehicle within the virtual environment based on one or both of (i) the plurality of photo-realistic scenes and (ii) the plurality of depth-map-realistic scenes; and
   a dataset component configured to generate one or more virtual feature training datasets based on at least one of (i) the plurality of photo-realistic scenes, (ii) the plurality of depth-map-realistic scenes, or (iii) the environment-object data,
   wherein the dataset component is further configured to generate at least one real-world training dataset, the real-world training dataset based on real-world data, the real-world training dataset normalized with respect to the one or more virtual feature training datasets,
   wherein the real-world data includes real-world environment-object data, the real-world environment-object data captured by one or more sensors associated with a real-world vehicle, and
   wherein the virtual feature training dataset and the real-world training dataset as normalized is associated with training a machine learning model to control an autonomous vehicle in a real-world autonomous driving application.

2. The non-transitory computer-readable medium of claim 1, wherein the feature training dataset is associated with training the machine learning model to detect or track one or more objects within the virtual environment or within a real-world environment.

3. The non-transitory computer-readable medium of claim 1, wherein the feature training dataset is associated with training the machine learning model to detect or track one or more vehicle lanes within the virtual environment or within a real-world environment.

4. The non-transitory computer-readable medium of claim 1, wherein the feature training dataset is associated with training the machine learning model to detect or track one or more road-free spaces within the virtual environment or within a real-world environment.

5. The non-transitory computer-readable medium of claim 1, wherein the feature training dataset is associated with training the machine learning model to predict, for an object within the virtual environment or within a real-world environment, one of future object behavior, object intent, or future object trajectory.

6. The non-transitory computer-readable medium of claim 1, wherein the feature training dataset is associated with training the machine learning model to estimate a depth based on one or more virtual cameras within the virtual environment.

7. The non-transitory computer-readable medium of claim 1, wherein the plurality of photo-realistic scenes comprises two-dimensional (2D) images that simulate real-world scenes captured by a 2D camera.

8. The non-transitory computer-readable medium of claim 7, wherein the 2D images comprise 2D pixel data.

9. The non-transitory computer-readable medium of claim 1, wherein one or more color pixels of each of the depth-map-realistic scenes are associated with one or more corresponding depths within the depth-map-realistic scene.

10. The non-transitory computer-readable medium of claim 1, wherein one or more color pixels of each of the depth-map-realistic scenes are associated with one or more corresponding simulated reflectivity values associated with one or more objects or surfaces within the virtual environment.

11. The non-transitory computer-readable medium of claim 1, wherein the environment-object data defines how a first object or surface interacts with a second object or surface within the virtual environment.

12. The non-transitory computer-readable medium of claim 11, wherein the first object or surface is the autonomous vehicle and the second object or surface is a virtual pothole.

13. The non-transitory computer-readable medium of claim 1, wherein the environment-object data relates to motion of a vehicle within the virtual environment.

14. The non-transitory computer-readable medium of claim 13, wherein the motion of the vehicle is defined by one or more of: a position of the vehicle, a velocity of the vehicle, an acceleration of the vehicle, or a trajectory of the vehicle.

15. The non-transitory computer-readable medium of claim 1, wherein the autonomous vehicle simulator is further configured to control the autonomous vehicle within the virtual environment based on the environment-object data.

16. The non-transitory computer-readable medium of claim 1, wherein the plurality of imaging scenes corresponds to a plurality of frames comprising a video.

17. The non-transitory computer-readable medium of claim 16, wherein the video is rendered at a select number of frames per second.

18. The non-transitory computer-readable medium of claim 17, wherein the select number of frames per second is 30 frames per second.

19. The non-transitory computer-readable medium of claim 16, wherein the video defines the autonomous vehicle moving along a standard route within the virtual environment, the standard route being a predefined route.

20. The non-transitory computer-readable medium of claim 19, wherein the standard route within the virtual environment defines a ground truth route.

21. The non-transitory computer-readable medium of claim 16, wherein the video defines the autonomous vehicle moving along an undetermined route within the virtual environment.

22. The non-transitory computer-readable medium of claim 1, wherein the real-world data includes a real-world photo-realistic scene, the real-world photo-realistic scene captured by a two-dimensional (2D) camera.

23. The non-transitory computer-readable medium of claim 1, wherein the real-world data includes a real-world depth-map realistic scene, the real-world depth-map realistic scene captured by a three-dimensional (3D) sensor.

24. The non-transitory computer-readable medium of claim 23, wherein the three-dimensional (3D) sensor is a lidar-based sensor.

25. The non-transitory computer-readable medium of claim 1, wherein the one or more sensors include any one or more of: accelerometers, gyroscopes, motion sensors, or GPS devices.

26. The non-transitory computer-readable medium of claim 1, wherein the dataset component is further configured to generate at least one real-world training dataset, the real-world training dataset based on real-world data and comprising one or more virtual objects superimposed onto the real-world data, wherein the real-world training dataset is associated with training the machine learning model to control the autonomous vehicle in the real-world autonomous driving application.

27. The non-transitory computer-readable medium of claim 1, wherein the virtual environment includes one or more objects or surfaces, and wherein each object or surface is associated with a descriptor.

28. The non-transitory computer-readable medium of claim 27, wherein the descriptor of each object or surface includes any one or more of the following: a unique identifier (ID) of the object or surface in the virtual environment, a category of the object or surface as defined within the virtual environment, a position value of the object or surface within the virtual environment, an orientation of the object or surface within the virtual environment, a velocity of the object or surface within the virtual environment, a reflectivity of the object or surface, or a status of the object or surface within the virtual environment.

29. The non-transitory computer-readable medium of claim 27, wherein the descriptor of each object or surface includes any one or more of the following: an object class of an object or surface in the virtual environment or a future trajectory of an object or surface in the virtual environment.

30. The non-transitory computer-readable medium of claim 1, wherein the automated training dataset generator further comprises a waypoint vehicle simulator configured to control one or more waypoint vehicles, wherein each waypoint vehicle follows a predetermined route within the virtual environment.

31. The non-transitory computer-readable medium of claim 30, wherein the one or more waypoint vehicles interact with the autonomous vehicle within the virtual environment.

32. The non-transitory computer-readable medium of claim 30, wherein the one or more waypoint vehicles implement one or more driving strategies.

33. The non-transitory computer-readable medium of claim 30, wherein the one or more driving strategies include any of: a conservative driving strategy, an aggressive driving strategy, or a normal driving strategy.

34. The non-transitory computer-readable medium of claim 30, wherein the machine learning model is trained with reinforcement learning, the reinforcement learning based on vehicle operation data captured when the autonomous vehicle interacts with the one or more waypoint vehicles.

35. The non-transitory computer-readable medium of claim 1, wherein the automated training dataset generator further comprises a sensor simulator configured to generate simulated sensor data within the virtual environment.

36. The non-transitory computer-readable medium of claim 35, wherein the sensor simulator positions one or more virtual sensors in the virtual environment, and wherein the one or more virtual sensors are configured to generate the simulated sensor data.

37. The non-transitory computer-readable medium of claim 35, wherein the sensor simulator generates the sensor data via ray casting.

38. The non-transitory computer-readable medium of claim 35, wherein the sensor simulator generates simulated lidar data or simulated radar data.

39. The non-transitory computer-readable medium of claim 35, wherein the sensor simulator generates the sensor data based on the depth-map-realistic scenes.

40. The non-transitory computer-readable medium of claim 35, wherein the sensor simulates the sensor data using a graphic shader.

41. The non-transitory computer-readable medium of claim 35, wherein a particular object or surface is associated with a reflectivity value within the virtual environment, and wherein the sensor simulator generates at least a portion of the sensor data based on the reflectivity value.

42. The non-transitory computer-readable medium of claim 41, wherein the reflectivity value is derived from a color of the particular object or surface.

43. The non-transitory computer-readable medium of claim 41, wherein the reflectivity value is derived from a normal angle to a position of a virtual sensor.

44. The non-transitory computer-readable medium of claim 35, wherein the simulated sensor data is accessed via direct memory access (DMA).

45. The non-transitory computer-readable medium of claim 1, wherein the automated training dataset generator further comprises a geo-spatial component configured to generate the virtual environment based on geo-spatial data, the geo-spatial data defining one or more positions of simulated objects or surfaces within the virtual environment.

46. The non-transitory computer-readable medium of claim 45, wherein the one or more simulated objects or surfaces include one or more of: a virtual road or street, a virtual building, a virtual tree or landscaping object, a virtual traffic sign, a virtual traffic light, a simulated pedestrian, or a simulated vehicle.

47. The non-transitory computer-readable medium of claim 45, wherein the geo-spatial data includes predefined images.

48. The non-transitory computer-readable medium of claim 47, wherein the predefined images are sourced from a remote server.

49. The non-transitory computer-readable medium of claim 45, wherein the geo-spatial data includes real-world lidar based data.

50. The non-transitory computer-readable medium of claim 45, wherein the geo-spatial data includes geo-spatial metadata, the geo-spatial metadata exposing detail parameters for generating the one or more simulated objects or surfaces within the virtual environment.

51. The non-transitory computer-readable medium of claim 50, wherein the detail parameters include a number of lanes for a road and a width for the road.

52. The non-transitory computer-readable medium of claim 50, wherein the detail parameters include elevation data for a particular simulated object or surface within the virtual environment.

53. The non-transitory computer-readable medium of claim 45, wherein the geo-spatial component updates the virtual environment via simultaneous localization and mapping (SLAM).

54. The non-transitory computer-readable medium of claim 45, wherein the geo-spatial component updates the virtual environment via photogrammetry.

55. The non-transitory computer-readable medium of claim 1, wherein the autonomous vehicle simulator is further configured to apply one or more driving strategies.

56. The non-transitory computer-readable medium of claim 55, wherein the one or more driving strategies are configurable driving strategies, the configurable driving strategies including parameters that when altered update vehicle operation of the autonomous vehicle within the virtual environment.

57. The non-transitory computer-readable medium of claim 1, further comprising a scenario simulator configured to generate one or more simulated environment scenarios, wherein each of the one or more simulated environment scenarios corresponds to a generation of variations of a particular object, surface, or situation within the virtual environment.

58. The non-transitory computer-readable medium of claim 57, wherein the particular object, surface, or situation is any one of: a road intersection, a stop sign, or a traffic light.

59. The non-transitory computer-readable medium of claim 57, wherein the particular object, surface, or situation is any one of: a pedestrian's activity within the virtual environment or a railroad arm's behavior within the virtual environment.

60. The non-transitory computer-readable medium of claim 57, wherein the one or more simulated environment scenarios are generated via one or more generative machine learning models.

61. The non-transitory computer-readable medium of claim 60, wherein the one or more generative machine learning models are one or more generative adversarial networks (GANs).

62. The non-transitory computer-readable medium of claim 57, wherein the one or more simulated environment scenarios are generated via procedural generation.

63. The non-transitory computer-readable medium of claim 1, wherein at least a portion of the virtual environment is generated via a plurality of generative machine learning models.

64. The non-transitory computer-readable medium of claim 63, wherein at least one of the plurality of generative machine learning is a generative adversarial network (GAN).

65. The non-transitory computer-readable medium of claim 63, wherein at least a portion of the virtual environment is generated based on data collected by real-world sensors associated with real-world vehicles.

66. The non-transitory computer-readable medium of claim 1, wherein the automated training dataset generator further comprises a configuration manager, the configuration manager accepting a predefined configuration, the predefined configuration defining configuration information for one or more objects or surfaces within the virtual environment.

67. The non-transitory computer-readable medium of claim 66, wherein the predefined configuration is a configuration file.

68. The non-transitory computer-readable medium of claim 66, wherein the predefined configuration file includes a JavaScript object notation (JSON) format.

69. The non-transitory computer-readable medium of claim 66, wherein the configuration information includes spawn positions for the one or more objects or surfaces within the virtual environment.

70. The non-transitory computer-readable medium of claim 66, wherein the configuration information includes one or more of the following: a weight of a particular object or surface, a number of sensors associated with a virtual vehicle, or a location of sensors placed on the virtual vehicle.

71. The non-transitory computer-readable medium of claim 1, wherein one or more outputs of the machine learning model are compared to one or more ground truth values.

72. The non-transitory computer-readable medium of claim 71, wherein the one or more ground truth values each include a vehicle action and a corresponding safety parameter, the safety parameter defining (i) a safety-related outcome, or (ii) a degree of safety, that is associated with the vehicle action.

73. The non-transitory computer-readable medium of claim 71, wherein the machine learning model is updated to choose vehicle actions that maximize a degree of safety across a plurality of ground truth values.

74. The non-transitory computer-readable medium of claim 73, wherein the machine learning model is updated to choose vehicle actions that vary the degree of safety across a plurality of ground truth values.

75. An automated training dataset generation method for generating feature training datasets for use in real-world autonomous driving applications based on virtual environments, the automated training dataset generation method comprising:

generating a plurality of imaging scenes defining a virtual environment, the plurality of imaging scenes including a plurality of photo-realistic scenes and a plurality of corresponding depth-map-realistic scenes;

generating environment-object data defining how objects or surfaces interact with each other in the virtual environment;

controlling an autonomous vehicle within the virtual environment based on one or both of (i) the plurality of photo-realistic scenes and (ii) the plurality of depth-map-realistic scenes; and generating one or more virtual feature training datasets based on at least one of (i) the plurality of photo-realistic scenes, (ii) the plurality of depth-map-realistic scenes, or (iii) the environment-object data; and generating at least one real-world training dataset, the real-world training dataset based on real-world data, the real-world training dataset normalized with respect to the one or more virtual feature training datasets, wherein the real-world data includes real-world environment-object data, the real-world environment-object data captured by one or more sensors associated with a real-world vehicle, and wherein the virtual feature training dataset and the real-world training dataset as normalized is associated with training a machine learning model to control an autonomous vehicle in a real-world autonomous driving application.

* * * * *